US010780527B2

(12) United States Patent
Richerzhagen et al.

(10) Patent No.: US 10,780,527 B2
(45) Date of Patent: Sep. 22, 2020

(54) MACHINING HEAD

(71) Applicant: SYNOVA SA, Duillier (CH)

(72) Inventors: Bernold Richerzhagen, Saint-Sulpice (CH); Ludovic Anderegg, Corseaux (CH); Maximilian Epple, Assens (CH); Annika Richmann, Lausanne (CH)

(73) Assignee: SYNOVA SA, Duillier (CH)

( * ) Notice: Subject to any disclaimer, the term of this patent is extended or adjusted under 35 U.S.C. 154(b) by 789 days.

(21) Appl. No.: 15/319,213

(22) PCT Filed: Jun. 12, 2015

(86) PCT No.: PCT/CH2015/000088
§ 371 (c)(1),
(2) Date: Mar. 2, 2017

(87) PCT Pub. No.: WO2015/192255
PCT Pub. Date: Dec. 23, 2015

(65) Prior Publication Data
US 2017/0182593 A1    Jun. 29, 2017

(30) Foreign Application Priority Data
Jun. 16, 2014    (EP) .................................... 14405051

(51) Int. Cl.
*B23K 26/146*    (2014.01)
*B23K 26/70*    (2014.01)
(Continued)

(52) U.S. Cl.
CPC .......... *B23K 26/146* (2015.10); *B23K 26/042* (2015.10); *B23K 26/1476* (2013.01); *B23K 26/702* (2015.10)

(58) Field of Classification Search
CPC .. B23K 26/146; B23K 26/042; B23K 26/702; B23K 26/1476; B23K 26/1462
(Continued)

(56) References Cited

U.S. PATENT DOCUMENTS 4,078,165 A * 3/1978 Tuttle .................... B23K 26/04
                                                       219/121.67
4,675,501 A   6/1987 Klingel
(Continued)

FOREIGN PATENT DOCUMENTS

CN           1306467 A      4/2009
CN         101396768 A      4/2009
(Continued)

OTHER PUBLICATIONS

Database WPI Week 201361, Thomson Scientific, London, GB, AN 2013-N20317, XP002733350, -& JP 2013 180308 A (Sugino Machine KK), Sep. 12, 2013, Abstract.
(Continued)

*Primary Examiner* — Jimmy Chou
(74) *Attorney, Agent, or Firm* — Birch, Stewart, Kolasch & Birch, LLP

(57) ABSTRACT

The invention relates to a machining head for coupling a laser beam into a liquid jet. This machining head comprises an optical unit having at least one optical element for focusing the laser beam, and a coupling unit having a liquid chamber that is delimited by a wall, wherein a nozzle having a nozzle opening for generating a liquid jet is disposed in the wall. In a state in which the coupling unit is connected to the optical unit, the laser beam that is capable of being focused by the optical unit is directable in a beam direction through the liquid chamber of the coupling unit into the nozzle opening, and is capable of being coupled into the liquid jet that is generatable by the nozzle and runs in the beam
(Continued)

direction. For the liquid chamber to be supplied with liquid from the optical unit, a liquid interface is formed between the optical unit and the coupling unit, wherein, in the state in which the coupling unit is connected to the optical unit, the liquid interface, when viewed in the beam direction, is disposed ahead of that optical element of the optical unit that is last in the beam direction.

18 Claims, 5 Drawing Sheets

(51) Int. Cl.
  *B23K 26/14* (2014.01)
  *B23K 26/042* (2014.01)
(58) Field of Classification Search
  USPC .............. 219/121.6, 121.61, 121.62, 121.74,
      219/121.75, 121.76, 121.78, 121.83,
      219/121.84
  See application file for complete search history.

(56) References Cited

U.S. PATENT DOCUMENTS

| | | | | | |
|---|---|---|---|---|---|
| 5,902,499 | A | * | 5/1999 | Richerzhagen | B23K 26/06 219/121.67 |
| 5,948,292 | A | * | 9/1999 | Tanaka | B23K 26/046 219/121.6 |
| 8,730,377 | B2 | * | 5/2014 | Matsumoto | H04N 5/23212 348/346 |
| 8,859,988 | B1 | * | 10/2014 | Gaebelein | B23K 26/146 250/432 R |
| 2001/0040152 | A1 | * | 11/2001 | Higashi | B23K 26/146 219/121.72 |
| 2002/0134768 | A1 | * | 9/2002 | Akaba | B23K 26/0604 219/121.63 |
| 2002/0162825 | A1 | * | 11/2002 | Lizotte | B23K 26/04 219/121.7 |
| 2003/0192865 | A1 | * | 10/2003 | Cole, III | B23K 26/04 219/121.67 |
| 2005/0218124 | A1 | * | 10/2005 | Jennings | B23K 26/032 219/121.65 |
| 2006/0046435 | A1 | | 3/2006 | Kida | |
| 2007/0278194 | A1 | * | 12/2007 | Hoelsher | B23K 26/04 219/121.6 |
| 2007/0278195 | A1 | | 12/2007 | Richerzhagen et al. | |
| 2009/0001063 | A1 | * | 1/2009 | Weick | B23K 26/032 219/121.85 |
| 2009/0045177 | A1 | * | 2/2009 | Koseki | B23K 26/0643 219/121.67 |
| 2009/0084765 | A1 | * | 4/2009 | Muratsubaki | B23K 26/146 219/121.67 |
| 2010/0108648 | A1 | * | 5/2010 | Koseki | B26F 3/004 219/121.67 |
| 2011/0127241 | A1 | * | 6/2011 | Rumsby | B23K 26/0626 219/121.62 |
| 2011/0240615 | A1 | * | 10/2011 | Suruceanu | B23K 26/40 219/121.71 |
| 2011/0297654 | A1 | * | 12/2011 | Yoshikawa | B23K 26/046 219/121.62 |
| 2012/0074110 | A1 | * | 3/2012 | Zediker | B23K 26/1224 219/121.72 |
| 2013/0298387 | A1 | * | 11/2013 | Kobier | H01M 10/0413 29/623.1 |
| 2014/0224780 | A1 | * | 8/2014 | Chida | B23K 26/707 219/121.83 |

FOREIGN PATENT DOCUMENTS

| | | |
|---|---|---|
| EP | 0 515 983 A1 | 12/1992 |
| EP | 1 833 636 B1 | 12/1992 |
| EP | 1199128 A1 | 4/2002 |
| JP | 60-33893 A | 2/1985 |
| JP | 2000-334590 A | 12/2000 |
| JP | 2000334590 * | 12/2000 |
| JP | 2001-276988 A | 10/2001 |
| JP | 2007-109943 A | 4/2007 |
| JP | 2008-30119 A | 2/2008 |
| JP | 2011-235347 A | 11/2011 |
| JP | 2012-210651 A | 11/2012 |
| JP | 2013-180308 A | 9/2013 |
| KR | 10-2009-0033143 A | 4/2009 |
| RU | 2089365 C1 | 9/1997 |
| RU | 2471600 C1 | 1/2013 |
| WO | WO 2006/050622 A1 | 5/2006 |

OTHER PUBLICATIONS

English Translation of the Chinese Office Action dated May 24, 2018 for corresponding Application No. 201580044055.5.
Korean Office Action dated Dec. 10, 2019, issued in Korean Application No. 10-2017-7001235 with an English translation thereof.
Japanese Office Action dated May 21, 2020, issued in Japanese Application No. 2019-118626—English Translation.

* cited by examiner

MACHINING HEAD

TECHNICAL FIELD

The invention relates to a machining head for coupling a laser beam into a liquid jet, said machining head comprising an optical unit having at least one optical element for focusing the laser beam, and a coupling unit having a liquid chamber that is delimited by a wall, wherein a nozzle having a nozzle opening for generating a liquid jet is disposed in the wall. In a state in which the coupling unit is connected to the optical unit, the laser beam that is capable of being focused by the optical unit is directable in a beam direction through the liquid chamber of the coupling unit into the nozzle opening, and is capable of being coupled into the liquid jet that is generatable by the nozzle and runs in the beam direction. Herein, for the liquid chamber to be supplied with liquid from the optical unit, a liquid interface is formed between the optical unit and the coupling unit.

PRIOR ART

Laser-machining devices in which the laser beam, for the latter to be guided to the material-machining location like in an optical waveguide, is coupled into a thin water jet are known. Such laser-machining devices have the advantage that the energy of the laser across the length of the water jet is concentrated on the cross section of the water jet. Accordingly, the focal point of the laser beam does not have to be continually tracked in the case of a varying spacing from the material-machining location. Moreover, such devices have the advantage that the material to be machined may be continuously cooled by the water jet.

In order for a thin water jet to be generated, and in order for the laser beam to be coupled into this water jet, laser-machining devices of this type have a machining head. This machining head may be variously constructed and shaped. In this way, said machining head may for example be sunk into the remaining laser-machining device such that the water jet with the laser beam coupled thereinto exits from a wall of the laser-machining device, so to speak. In this case, an object to be machined may be moved relative to the machining head in front of this wall, so that the water jet with the laser beam coupled thereinto may reach the locations of the object that are to be machined. However, there is also the possibility for the machining head to form a free distal end of the laser-machining device, or to be disposed on a free distal end of a movable arm of the laser-machining device. This enables the water jet with the laser beam coupled thereinto to be able to be moved over an object to be machined, in order for the locations that have to be machined to be reached by the water jet.

Independently of how the machining head is specifically shaped, the latter is typically formed by an optical unit and a coupling unit. The optical unit herein comprises at least one optical element, such as a lens element or a group of lens elements, for the laser beam to be focused. By contrast, the coupling unit comprises a nozzle having a nozzle opening for a liquid jet to be generated. Herein, the optical unit and the coupling unit are mutually disposed in such a manner in the machining head that the optical unit may focus the laser beam into the liquid jet in such a manner that the laser beam is coupled into the liquid jet.

One example of a machining head of this type is described in EP 1 833 636 B1 by Synova S. A. This machining head comprises a coupling unit for generating a liquid jet by means of a liquid nozzle. This machining head furthermore comprises an optical unit by means of which a laser beam is focused into the liquid duct of the liquid nozzle for the laser beam to be coupled into the liquid jet. The coupling unit comprises a mount, a window element, and a closure part. A conical opening for the optical unit is disposed on the upper side of the mount. At the lower end of this conical opening, the mount has a shoulder on which the window element by way of the upper side thereof lies. The closure part is disposed on the lower side of the window element and terminates toward the bottom a thin disk-shaped intermediate space between the window element and the closure part. This intermediate space serves as a liquid-infeed line for the liquid nozzle which is inserted into a clearance in the upper side of the closure part that faces the intermediate space. This liquid nozzle has a central duct which forms a fine liquid jet into which the laser radiation is coupled.

The disadvantage of such machining heads is that the latter, in a manner perpendicular to the liquid jet, have large width. Moreover, the liquid jet is stable only across a limited length. Thereafter, said liquid jet disintegrates into individual drops which across a length of a slope are transformed to slightly complanate and approximately spherical drops. Since only the stable liquid jet may serve as a light conductor of the laser beam, the available distance from the liquid nozzle to the location to be machined is limited. This leads to substantially planar workpieces being able to be readily machined by such machining heads. However, as soon as locations that are more difficult to access are to be machined in the context of three-dimensional machining of objects, such machining heads are unsuitable. In this case, the latter by virtue of their width would collide with the object to be machined if and when the object is held sufficiently close to the machining head for the location to be machined to be reached by a stable liquid jet with a laser beam coupled thereinto.

DESCRIPTION OF THE INVENTION

It is an object of the invention to provide a machining head that is associated with the technical field mentioned at the outset, and that also enables three-dimensional machining of objects.

The achievement of the object is defined by the features of claim 1. According to the invention, in the state in which the coupling unit is connected to the optical unit, the liquid interface, when viewed in the beam direction, is disposed ahead of that optical element of the optical unit that is last when viewed in the beam direction.

Herein, the term "liquid interface" means that location at which liquid from the optical unit is directed onward to the coupling unit, for the liquid chamber to be supplied with liquid. To this end, the optical unit has an opening from which liquid for the liquid chamber may exit the optical unit. Moreover, the coupling unit has an opening into which liquid for the liquid chamber may be directed. In the state in which the coupling unit is connected to the optical unit, these two openings are mutually disposed in such a manner that liquid exiting from the opening in the optical unit may flow into the opening in the coupling unit. On account thereof, the two openings, conjointly with a region which is optionally enclosed between the optical unit and the coupling unit and into which liquid exiting from the opening in the optical unit is directed to the opening in the coupling unit, form the liquid interface. Herein, in the state in which the coupling unit is connected to the optical unit, the two openings may lie directly on top of one another. In this case, the two openings lying on top of one another form the liquid interface. However, the two openings may also be disposed so as to be somewhat mutually laterally offset. Independently of the arrangement of the two openings, the optical unit and the coupling unit may moreover enclose a region in which liquid exiting from the opening in the optical unit is directed to the opening in the coupling unit. This region may be delimited by one or a plurality of seals that is/are disposed between the optical unit and the coupling unit, for example. In this case, the liquid interface extends across this region and the two openings.

The last optical element of the optical unit, when viewed in the beam direction, is that optical element through which the laser beam is directed as the last in the optical unit before said laser beam leaves the optical unit and is coupled into the liquid jet in the coupling unit. Therefore, this last optical element may be a lens element or a group of lens elements, for example, by means of which the laser beam may be focused. However, the last optical element when viewed in the beam direction may also be a window that closes off the optical unit towards the outside and per se does not have any focusing properties. Independently of the concrete embodiment of the last optical element when viewed in the beam direction, the liquid interface according to the invention, when viewed in the beam direction, is disposed ahead of this optical element such that a laser beam that is directed through the optical unit is first directed beside the liquid interface so as to bypass the latter, or is directed through the liquid interface, before said laser beam passes the last optical element of the optical unit. It is irrelevant to the solution according to the invention herein, whether the coupling unit is connectable directly to the optical unit, or whether the coupling unit is connectable to the optical unit by way of an intermediate element. It is equally irrelevant how the optical unit and the coupling unit are specifically configured. In this way, the optical unit may be attachable as a separate unit to a laser-machining device, for example. On account thereof, a laser beam that has been generated by a laser that is associated with the laser-machining device may be directed through the optical unit. This laser may be focused by the optical unit and may be coupled into the liquid jet that is generated by the coupling unit that is attached to the optical unit. However, the optical unit may also for example form the end region of a lance of a laser-machining device, in which the laser beam that has been generated by the laser that is associated with the laser-machining device is guided. In this case, the lance may be part of the laser-machining device, and in the end region thereof transition to the optical unit. Herein, the coupling unit may be fastened externally to that end region of the lance that is part of the optical unit, for example.

The solution according to the invention has the advantage that the machining head may be constructed so as to be smaller. Moreover, the machining head in that region where the liquid jet with the laser beam coupled thereinto leaves the machining head may be built so as to be narrower. On account thereof, locations that are difficult to access may be more readily reached by a stable liquid jet and a laser beam coupled thereinto by way of the machining head. Accordingly, three-dimensional machining of objects is also facilitated on account thereof.

Advantageously, in the state in which the coupling unit is connected to the optical unit, the liquid interface has a liquid-interface area that is aligned at an angle in relation to a plane that is aligned so as to be perpendicular to the beam direction. The liquid-interface area herein runs through the liquid interface and thus between that surface of the optical unit that surrounds the opening in the optical unit and that surface of the coupling unit that surrounds the opening in the coupling unit. Therefore, when the opening in the optical unit lies directly on the opening of the coupling unit such that the liquid for supplying the liquid chamber that is directed from the optical unit to the coupling unit flows directly from the opening in the optical unit into the opening of the coupling unit, the liquid-interface area is thus defined by that region of the surfaces of the optical unit and of the coupling unit that lie on top of one another that lies around the two openings, and steadily runs onward in that region where the respective surfaces of the optical unit and of the coupling unit are absent by virtue of the openings. It is insignificant herein whether these regions of the surfaces that lie around the two openings are limited to the liquid interface, or whether said regions reach to just outside the liquid interface. By contrast, when the opening in the optical unit does not lie directly on the opening of the coupling unit, and when the liquid for supplying the liquid chamber that exits from the opening in the optical unit is directed through a region that is enclosed between the optical unit and the coupling unit to the opening in the coupling unit, the liquid-interface area thus runs between that region of the surface of the optical unit that lies around the opening in the optical unit and that region of the coupling unit that lies around the opening in the coupling unit. When a spacing between the surface of the optical unit and the surface of the coupling unit in the region around the openings is constant, and when the two surfaces in this region thus run so as to be mutually parallel, the liquid-interface area thus runs parallel with the surface of the optical unit and parallel with the surface of the coupling unit between these two surfaces, and runs steadily onward in that region where the respective surfaces of the optical unit and of the coupling unit are absent by virtue of the openings. It is insignificant herein whether these regions of the surfaces that lie around the two openings are limited to the liquid interface, or whether said regions reach to just outside the liquid interface. By contrast, when the surface of the optical unit runs at an angle in relation to the surface of the coupling unit such that a spacing measured perpendicularly to the surfaces between the two surfaces within the liquid interface varies, the liquid-interface area thus runs between these two surfaces. The liquid-interface area herein encloses an identical angle in relation to the surface of the optical unit and in relation to the surface of the coupling unit, and runs steadily onward in that region where the respective surfaces of the optical unit and of the coupling unit are absent by virtue of the openings. It is insignificant herein whether these regions of the surfaces that lie around the two openings are limited to the liquid interface, or whether said regions reach to just outside the liquid interface.

Since both, that region of the surface of the optical unit that lies around the opening in the optical unit, as well as that region of the surface of the coupling unit that lies around the opening in the coupling unit, may be curved, the liquid-interface area may also be curved. In this way, the coupling unit may have a cylindrical region, for example, the opening for the supply of the liquid chamber with liquid being disposed on the radial external area of said cylindrical region. Moreover, the optical unit may have an opening having a circular cross section, for example, into which the cylindrical region of the coupling unit may be pushed for connecting the coupling unit to the optical unit. In this case, the opening in the optical unit from which liquid for the liquid chamber may exit from the optical unit may be disposed on the internal side of the opening having the circular cross section. Since the liquid interface thus lies on the cylindrical region of the coupling unit, the liquid-interface area also follows the shape of the cylindrical region of the coupling unit. The liquid-interface area in this case is thus curved.

The liquid-interface area being aligned perpendicularly to the plane aligned to the beam direction means that within the liquid interface the normal in the case of each point of the liquid-interface area onto this point encloses an angle in relation to the beam direction and said normal is thus not aligned so as to be parallel with the beam direction. This has the advantage that the liquid interface may be sealed in a simple manner if and when the coupling unit for connection to the optical unit is configured so as to be movable counter to the beam direction in relation to the optical unit and thus so as to be connectable to the optical unit in a simple manner. Herein, if and when the liquid-interface area is aligned at an angle to the movement direction of the coupling unit, upon connection of the coupling unit to the optical unit the opening in the coupling unit and the opening in the optical unit are not moved in the direction of the normal of that region of the surface of the optical unit that lies around the opening of the optical unit, and of the normal of that region of the surface of the coupling unit that lies around the opening in the coupling unit, but are converged in a lateral direction. On account thereof, the liquid interface may be sealed in a simpler manner.

In one preferred variant thereof, the liquid-interface area runs parallel with the beam direction. This means that within the liquid interface the normal in the case of each point of the liquid-interface area onto this point lies in a plane that is aligned perpendicularly to the beam direction. This has the advantage that the liquid interface may be sealed in a simple manner if and when the coupling unit for connection to the optical unit is configured so as to be movable counter to the beam direction in relation to the optical unit and thus so as to be connectable to the optical unit in a simple manner, because the liquid-interface area herein is aligned so as to be parallel with the movement direction of the coupling unit and, accordingly, the opening in the coupling unit is pushed along that region of the surface of the coupling unit that lies around this opening in front of the opening in the optical unit. In order for this advantage to be achieved, it does not matter whether the liquid-interface area within the liquid interface is flat in a planar manner, or is curved. In this way, the coupling unit may have a cylindrical region, for example, the opening for the supply of the liquid chamber with liquid being disposed on the radial external area thereof, while the optical unit has an opening having a circular cross section into which the cylindrical region of the coupling unit may be pushed for connecting the coupling unit to the optical unit. In this case, the opening in the optical unit from which liquid for the liquid chamber may exit from the optical unit may be disposed on the internal side of the opening having a circular cross section. The liquid-interface area in this case is thus curved. However, there is also the possibility for the coupling unit to have a region having a square cross section, for example, wherein the opening for the supply of the liquid chamber with liquid is disposed on one of the four flat external sides of this region. The optical unit herein may have an opening having a likewise square cross section into which the region of the coupling unit may be pushed counter to the beam direction for connecting the coupling unit to the optical unit. In this case, the opening in the optical unit from which liquid for the liquid chamber may exit from the optical unit may be disposed on the internal side of the opening having a square cross section, on one of the four flat sides. The liquid-interface area in this case is thus flat in a planar manner.

Alternatively thereto, however, there is also the possibility that, in the state in which the coupling unit is connected to the optical unit, the liquid interface has a liquid-interface area which at least in one region is aligned so as to be parallel with that plane that is aligned perpendicularly to the beam direction.

The coupling unit advantageously has at least one liquid duct which connects the liquid interface to the liquid chamber. This has the advantage that the liquid chamber may be supplied with liquid in a simple manner in that the liquid that is transferred from the optical unit is directed into that opening in the coupling unit into which liquid for the liquid chamber may be directed, so as to be directed from there through the liquid duct to the liquid chamber.

Alternatively thereto, however, there is also the possibility for the coupling unit not to have any liquid duct of this type, since the liquid chamber is supplied with liquid in another manner. This may be the case, for example, if and when that opening in the coupling unit through which liquid for the liquid chamber may be directed is connected directly to the liquid chamber. An alternative of this type has the advantage that the machining head may be constructed in a more compact manner, on account of which locations that are difficult to reach with the machining head may be more easily reached, and three-dimensional machining of objects is simplified.

The coupling unit preferably tapers off in one direction, wherein this direction, in the state in which the coupling unit is connected to the optical unit, corresponds to the beam direction. On account thereof, the width of the machining head, measured transversely to the beam direction, decreases toward that location of the machining head at which the liquid jet that is generatable by the nozzle opening exits the machining head. On account thereof, also locations that are difficult to reach may be more easily reached, this simplifying three-dimensional machining of objects.

Alternatively thereto, however, there is also the possibility for the coupling unit not to taper off in a direction that in the state in which the coupling unit is connected to the optical unit, corresponds to the beam direction. An alternative of this type may have the advantage that the machining head may be constructed in simpler manner and may thus be manufactured in a more cost-effective manner.

In the case of the coupling unit tapering off in one direction, wherein this direction in the state in which the coupling unit is connected to the optical unit, corresponds to the beam direction, the tapering is advantageously cone-shell-shaped. This has the advantage that the tapering, when viewed in the beam direction, is constantly uniform. On account thereof, the machining head in relation to an area to be machined may be readily inclined according to the cone-opening angle of the cone-shell-shaped tapering. This facilitates the accessibility of locations that are difficult to reach, thus simplifying three-dimensional machining of objects.

Alternatively thereto, however, there is also the possibility of the tapering to have another shape than a cone-shell shape.

In the case of the coupling unit tapering off in a cone-shell-shaped manner in one direction, wherein this direction, in the state in which the coupling unit is connected to the optical unit, corresponds to the beam direction, the cone-shell-shaped tapering preferably has a cone-opening angle, measured between a rotationally symmetrical central axis of the cone-shell shape and the external area of the cone-shell shape, of at most 60°, at most 45°, at most 30°, in particular of at most 20°. This has the advantage that locations that are difficult to access may be reached in an optimal manner, this simplifying three-dimensional machining of objects.

As an alternative thereto, however, the cone-shell-shaped tapering may also have a cone-opening angle of more than 20°, or of more than 30°, more than 45°, or more than 60°, respectively. This has the advantage that the construction of the coupling unit is simplified.

The coupling unit preferably has a gas-exit nozzle for shaping a gas jet that envelops the liquid jet. This has the advantage that the length across which the liquid jet is stable is larger. Since the laser beam remains coupled into only the stable liquid jet, the potential spacing of the machining head from a location to be machined may be increased on account thereof. Accordingly, locations that are difficult to access with the machining head may be machined in a simpler manner on account thereof, this simplifying three-dimensional machining of objects.

As an alternative, thereto, the coupling unit may also have no gas-exit nozzle for shaping a gas jet that envelops the liquid jet. An alternative of this type has the advantage that the machining head may be constructed in a simpler manner and may be manufactured in a correspondingly more cost-effective manner. Moreover, servicing of the machining head is simplified on account thereof.

In the case of the coupling unit having a gas-exit nozzle for shaping a gas jet that envelops the liquid jet, the coupling unit moreover preferably has a gas back-pressure chamber which, in the state in which the coupling unit is connected to the optical unit, is disposed behind the nozzle opening when viewed in the beam direction. Such a gas back-pressure chamber has the advantage that the generation of a gas jet that envelops the liquid jet and that enlarges the length across which the liquid jet is stable is simplified.

Alternatively thereto, however, there is also the possibility for the coupling unit to have no gas back-pressure chamber of this type. This has the advantage that the coupling unit may be constructed in a simpler manner.

In the case of the coupling unit having a gas-exit nozzle for shaping a gas jet that envelops the liquid jet, in the state in which the coupling unit is connected to the optical unit, the gas-exit nozzle is preferably disposed in the beam direction, when viewed from the nozzle opening. The gas-exit nozzle herein, when viewed from the nozzle opening, may be disposed directly behind the nozzle opening in the beam direction. However, there is also the possibility for an optionally available gas back-pressure chamber to be disposed between the nozzle opening and the gas-exit nozzle. In this case, the liquid jet that is generatable by the nozzle opening in the beam direction may run through the gas back-pressure chamber and exit through the gas-exit nozzle from the coupling unit. The advantage of the arrangement of the gas-exit nozzle in the beam direction, when viewed from the nozzle opening, is that the liquid jet that is generatable by the nozzle opening may exit through the gas-exit nozzle from the coupling unit such that a gas jet that envelops the liquid jet in an optimal manner may be generated by the gas-exit nozzle.

Alternatively thereto, however, there is also the possibility for the gas-exit nozzle to be disposed in another manner.

In the case of the coupling unit having a gas-exit nozzle for shaping a gas jet that envelops the liquid jet, in the state in which the coupling unit is connected to the optical unit, for the coupling unit to be supplied with gas for the gas jet, a gas interface is preferably formed between the optical unit and the coupling unit. To this end, the optical unit has an opening from which gas for the gas jet may exit from the optical unit. Moreover, the coupling unit has an opening into which gas for the gas jet may be directed. These two openings, in the state in which the coupling unit is connected to the optical unit, are mutually disposed in such a manner that gas that exits from the opening in the optical unit may flow into the opening in the coupling unit. On account thereof, the two openings, conjointly with a region that is optionally enclosed between the optical unit and the coupling unit and in which gas that exits from the opening in the optical unit is directed to the opening in the coupling unit, form the gas interface. Herein, the two openings, in the state in which the coupling unit is connected to the optical unit, may lie directly on one another so as to be mutually facing. In this case, the two openings that lie on one another form the gas interface. However, the two openings may also be disposed so as to be somewhat laterally offset in relation to one another. Independently of the arrangement of the two openings, the optical unit and the coupling unit may moreover enclose a region in which gas that exits from the opening in the optical unit is directed to the opening in the coupling unit. This region may be delimited by one or a plurality of seals that are disposed between the optical unit and the coupling unit, for example. In this case, the gas interface extends across this region and the two openings.

The advantage of the gas interface is that the machining head may be constructed in a compact manner, since the coupling unit does not have to have a connector for the supply with gas for the gas jet that is separate from the connection to the optical unit. This advantage is achieved independently of whether the gas for the gas jet is directed in the gaseous state or in a liquefied form from the optical unit through the gas interface to the coupling unit.

As an alternative, however, in the state in which the coupling unit is connected to the optical unit, for the coupling unit to be supplied with gas for the gas jet there is also the possibility for there to be no gas interface to be formed between the optical unit and the coupling unit. An alternative of this type has the advantage that the connection of the coupling unit to the optical unit is simplified.

If and when in the state in which the coupling unit is connected to the optical unit, a gas interface is formed between the optical unit and the coupling unit for the coupling unit to be supplied with gas for the gas jet, the gas interface which, when viewed in the beam direction, is advantageously disposed ahead of that optical element of the optical unit that is last when viewed in the beam direction. On account thereof, a laser beam that is directed through the optical unit is first directed beside the gas interface so as to bypass the latter, or is directed through the gas interface, before said laser beam passes the last optical element of the optical unit. This has the advantage of a potentially smaller construction. Moreover, on account thereof, the machining head in that region where the liquid jet having the laser beam coupled thereinto and enveloped by the gas jet exits the machining head, may be constructed so as to be narrower. On account thereof, locations that are difficult to access by the machining head may be reached in a simpler manner by a stable liquid jet and a laser beam coupled thereinto. Accordingly, three-dimensional machining of objects is facilitated on account thereof.

As an alternative thereto, however, there is also the possibility for the gas interface, when viewed in the beam direction, to be disposed level with the last optical element of the optical unit when viewed in the beam direction, or else behind the last optical element of the optical unit when viewed in the beam direction.

In the case of the coupling unit having a gas-exit nozzle for shaping a gas jet that envelops the liquid jet, and in the case that in the state in which the coupling unit is connected to the optical unit, a gas interface is formed for the coupling unit to be supplied with gas for the gas jet, the gas interface in the state in which the coupling unit is connected to the optical unit preferably has a gas-interface area that is aligned at an angle in relation to a plane that is aligned so as to be perpendicular to the beam direction. Herein, it does not matter whether the gas interface, in the state in which the coupling unit is connected to the optical unit, is disposed ahead of, behind, or level with the last optical element of the optical unit when viewed in the beam direction.

This gas-interface area runs through the gas interface and thus between the opening in the optical unit from which gas for the gas jet may exit from the optical unit and the opening in the coupling unit into which gas for the gas jet may be directed, and between the surfaces of the optical unit and of the coupling unit that surround these openings. Therefore, if and when the opening in the optical unit lies directly on the opening of the coupling unit, such that gas for supplying the gas jet that is directed from the optical unit to the coupling unit flows directly from the opening in the optical unit into the opening of the coupling unit, the gas-interface area is defined by the region around the two openings of the surfaces of the optical unit and of the coupling unit that lie on one another and steadily runs onward in that region of the two openings where the respective surfaces of the optical unit and of the coupling unit are absent by virtue of the openings. It is insignificant herein whether the regions of the surfaces that lie around the two openings are delimited to the gas interface, or whether said regions reach to just outside the gas interface. By contrast, if and when the opening in the optical unit does not lie directly on the opening of the coupling unit, and the gas for supplying the gas jet that exits from the opening in the optical unit is directed through a region that is enclosed between the optical unit and the coupling unit to the opening in the coupling unit, the gas-interface area runs between that region of the surface of the optical unit that lies around the opening in the optical unit and that region of the surface of the coupling unit that lies around the opening in the coupling unit. If and when a spacing between the surface of the optical unit and the surface of the coupling unit in the region around the openings is constant, and the two surfaces in this region thus run so as to be mutually parallel, the gas-interface area runs parallel with the surface of the optical unit and parallel with the surface of the coupling unit, running between these two surfaces, and in that region where the respective surfaces of the optical unit and of the coupling unit are absent by virtue of the two openings runs steadily onward. It is insignificant herein whether the regions of the surface that lie around the two openings are delimited to the gas interface or whether said two openings reach just outside the gas interface. By contrast, if and when the surface of the optical unit runs at an angle in relation to the surface of the coupling unit such that a spacing between the two surfaces that is measured perpendicularly to the surfaces within the gas interface is modified, the gas-interface area runs between these two surfaces. The gas-interface area herein in relation to the surface of the optical unit and in relation to the surface of the coupling unit encloses an identical angle, and in that region where the respective surfaces of the optical unit and of the coupling unit are absent by virtue of the openings runs steadily onward. Herein, it is likewise insignificant whether these regions of the surface that lie around the two openings are delimited to the gas interface, or whether said two openings reach just outside the gas interface.

Since both, that region of the surface of the optical unit that lies around the opening in the optical unit, and that region of the surface of the coupling unit that lies around the opening in the coupling unit, may be curved, the gas-interface area may also be curved. In this way, the coupling unit may have a cylindrical region, for example, the opening unit for supplying the gas jet with gas being disposed on the radial external region of said cylindrical region. Moreover, the optical unit may have an opening having a circular cross section, for example, into which the cylindrical region of the coupling unit may be pushed for connecting the coupling unit to the optical unit. In this case, the opening in the optical unit from which gas for the gas jet may exit from the optical unit may be disposed on the internal side of the opening having a circular cross section. Since the gas interface thus lies on the cylindrical region of the coupling unit, the gas-interface area also follows the shape of the cylindrical region of the coupling unit. The gas-interface area in this case is thus curved.

The gas-interface area being aligned at an angle in relation to the plane that is aligned perpendicularly to the beam direction means that within the gas interface the normal in the case of each point of the gas-interface area onto this point encloses an angle in relation to the beam direction and said normal is thus not aligned so as to be parallel with the beam direction. This has the advantage that the gas interface may be sealed in a simple manner if and when the coupling unit for connection to the optical unit is configured so as to be movable counter to the beam direction in relation to the optical unit and thus so as to be connectable to the optical unit in a simple manner. The reason therefor is that the gas-interface area is aligned at an angle in relation to the movement direction of the coupling unit, on account of which upon connection of the coupling unit to the optical unit the opening in the coupling unit and the opening in the optical unit are not moved in the direction of the normal of that region of the surface of the optical unit that lies around the opening of the optical unit, and of the normal of that region of the surface of the coupling unit that lies around the opening in the coupling unit, but are converged in a lateral direction. On account thereof, the gas interface may be sealed in a simpler manner.

The gas interface, in the state in which the coupling unit is connected to the optical unit, preferably runs parallel with the beam direction. This means that within the gas interface the normal in the case of each point of the gas-interface area onto this point is aligned perpendicularly to the beam direction. This has the advantage that the gas interface may be sealed in a simple manner if and when the coupling unit for connection to the optical unit is configured so as to be movable counter to the beam direction in relation to the optical unit and thus so as to be connectable to the optical unit in a simple manner, because the gas-interface area herein is aligned so as to be parallel with the movement direction of the coupling unit and, accordingly, the opening in the coupling unit is pushed along that region of the surface of the coupling unit that lies around this opening in front of the opening in the optical unit. In order for this advantage to be achieved, it does not matter whether the gas-interface area within the liquid interface is flat in a planar manner, or is curved. In this way, the coupling unit may have a cylindrical region, for example, the opening for the supply of the gas jet chamber with gas being disposed on the radial external area thereof, while the optical unit has an opening having a circular cross section into which the cylindrical region of the coupling unit may be pushed for connecting the coupling unit to the optical unit. In this case, the opening in the optical unit from which gas for the gas jet may exit from the optical unit may be disposed on the internal side of the opening having a circular cross section. The gas-interface area in this case is thus curved. However, there is also the possibility for the coupling unit to have a region having a square cross section, for example, wherein the opening for the supply of the gas jet with gas is disposed on one of the four flat external sides of this region. The optical unit herein may have an opening having a likewise square cross section into which the region of the coupling unit may be pushed counter to the beam direction for connecting the coupling unit to the optical unit. In this case, the opening in the optical unit from which gas for the gas jet may exit from the optical unit may be disposed on the internal side of the opening having a square cross section, on one of the four flat sides. The gas-interface area in this case is thus flat in a planar manner.

Alternatively thereto, however, there is also the possibility for the gas interface, in a state in which the coupling unit is connected to the optical unit, has a gas-interface area which is aligned so as to be parallel at least in one region with that plane that is aligned perpendicularly to the beam direction.

The coupling unit advantageously has at least one gas duct which connects the gas interface to the gas-exit nozzle. This has the advantage that the gas-exit nozzle may be supplied with gas in a simple manner in that gas that is transferred from the optical unit is directed into that opening in the coupling unit into which gas for the gas jet may be directed, so as to be directed from there through the gas duct to the gas-exit nozzle. It does not matter herein whether the gas from the gas duct is first directed to the optionally available gas back-pressure chamber and then to the gas-exit nozzle, or whether the gas is directed directly to the gas-exit nozzle.

Alternatively thereto, however, there is also the possibility for the coupling unit not to have any gas duct of this type, since the gas-exit nozzle is supplied with gas in another manner. This may be the case, for example, if and when that opening in the coupling unit through which gas for the gas jet may be directed is connected directly to the gas-exit nozzle or to the optionally available gas back-pressure chamber. An alternative of this type has the advantage that the machining head may be constructed in a more compact manner, on account of which locations that are difficult to reach with the machining head may be more easily reached, and three-dimensional machining of objects is simplified.

In the case of the coupling unit having a gas-exit nozzle, the coupling unit advantageously has a replaceable head-tip unit in which the gas-exit nozzle is disposed. This has the advantage that the head-tip unit having the gas-exit nozzle may be replaced in a simple manner if and when the gas-exit nozzle displays signs of wear and therefore the gas jet that is generatable by the latter no longer envelops the liquid jet in an optimal manner.

Alternatively thereto, there is also the possibility for the coupling unit not to have such a head-tip having a gas-exit nozzle.

In the case of the coupling unit having a gas-exit nozzle and a head-tip unit, wherein the gas-exit nozzle is disposed in the head-tip unit, the head-tip unit preferably has a conical external shape. Since the head-tip unit is disposed on the tip of the machining head, this has the advantage that the tip of the machining head from which the liquid jet and the gas jet exit is narrower. On account thereof, locations that are difficult to access may be more easily reached by the machining head, this simplifying three-dimensional machining of objects.

As a preferred variant thereof, the head-tip unit tapers off toward that location where the liquid jet and the gas jet exit from the machining head. This likewise has the advantage that the machining head in the region of this location is narrower, on account of which locations that are difficult to access may be reached by the machining head. Accordingly, three-dimensional machining of objects is simplified on account thereof.

Alternatively thereto, however, there is also the possibility for the head-tip unit neither to have a conical external shape nor to taper off toward that location where the liquid jet and the gas jet exit from the machining head.

Independently of the coupling unit having a gas-exit nozzle and optionally a replaceable head-tip unit, the nozzle having a nozzle opening for generating the liquid jet is preferably disposed in a replaceable nozzle block. Herein, the replaceable nozzle block may be inserted into that wall of the coupling unit that delimits the liquid chamber, or form that wall of the coupling unit that delimits the liquid chamber. The replaceable nozzle block has the advantage that the nozzle block having the nozzle may be replaced in a simple manner if and when the nozzle displays signs of wear, and therefore the liquid jet that is generatable by the nozzle opening is stable across a reduced length or is no longer stable at all.

Alternatively thereto, however, there is also the possibility for the coupling unit to not comprise a replaceable nozzle block in which the nozzle having the nozzle opening for generating the liquid jet is disposed.

The coupling unit advantageously has a cavity which is open on one side and into which, in the state in which the coupling unit is connected to the optical unit, the optical unit protrudes. This has the advantage that the coupling unit is connectable to the optical unit in a simple manner. Moreover, this has the advantage that the last optical element of the optical unit when viewed in the beam direction, in the state in which the coupling unit is connected to the optical unit, may be located in this cavity and, accordingly, may be protected toward the outside by the coupling unit. Herein, the last optical element of the optical unit when viewed in the beam direction may nevertheless be readily accessible if and when the coupling unit is removed from the optical unit.

Alternatively thereto, however, there is also the possibility for the coupling unit not to have a cavity of this type that is open on one side.

Independently of whether the coupling unit has a cavity which is open on one side and into which, in the state in which the coupling unit is connected to the optical unit, the optical unit protrudes, the optical unit preferably forms a ferrule and encloses the coupling unit at the liquid interface. On account thereof, the liquid interface is located on the internal side of the ferrule. This leads to the opening from which liquid for the liquid chamber may exit from the optical unit to be located on the internal side of the ferrule. Accordingly, the opening from which liquid for the liquid chamber may exit from the optical unit is better protected if and when the coupling unit is not connected to the optical unit. Moreover, the ferrule has the advantage that a connection of the coupling unit to the optical unit is better guided.

Alternatively thereto, however, there is also the possibility for the optical unit not to form a ferrule, or for the optical unit not to enclose the coupling unit at the liquid interface.

The liquid chamber on one side is advantageously closed by an element that is transparent to the laser light of the laser beam, wherein, in the state in which the coupling unit is connected to the optical unit, the transparent element in the beam direction is disposed ahead of the liquid chamber. This has the advantage that the laser beam that is capable of being focused by the optical unit may be directed through the transparent element into the liquid chamber such that coupling the laser beam into the liquid jet is facilitated.

As an alternative thereto, however, there is also the possibility for the liquid chamber on one side not to be closed by an element that is transparent to the laser light of the laser beam.

The nozzle opening preferably has a diameter in the range from 20 µm to 150 µm. This has the advantage that the nozzle may be manufactured in a cost-effective manner and nevertheless has a nozzle opening having a minor diameter. The nozzle opening particularly preferably has a diameter in the range from 40 µm to 80 µm. This has the advantage that a liquid jet that has a diameter into which the laser beam may be coupled in an optimal manner may be generated by the nozzle opening. In one further preferred variant, the nozzle opening has a diameter of less than 40 µm, particularly preferably of less than 30 µm, or less than 20 µm. This has the advantage that a liquid jet having a very minor diameter may be generated, on account of which a more refined and more precise machining of objects is enabled.

Alternatively thereto, however, there is also the possibility for the nozzle opening to have a diameter of more than 80 µm, or more than 150 µm, respectively.

The laser beam is preferably capable of being focused by the optical unit onto a focal point which has a diameter which is at most two thirds, particularly preferably at most half, of the size of the diameter of the nozzle opening. This means that at the focal point at least 95% of the energy of the laser beam passes an area, aligned perpendicularly to the beam direction, within a circle of which the diameter is preferably at most two thirds, particularly at most half, the size of the diameter of the nozzle opening. In one advantageous variant thereof, at least 98% of the energy of the laser beam passes the area within this circle. This has the advantage that the laser beam may be coupled into the liquid jet that is generatable by the nozzle opening in an optimal manner.

Alternatively thereto, however, there is also the possibility for the laser beam to be capable of being focused by the optical unit onto a focal point of which the diameter is larger than half of the size, or larger than two thirds of the size of the diameter of the nozzle opening.

A liquid-jet laser machine tool preferably comprises a machining head according to the invention. However, there is also the possibility for the machining head to be manufactured, marketed, and stored separately from the liquid-jet laser machine tool.

In the case of a liquid-jet laser machine tool comprising a machining head according to the invention, said liquid-jet laser machine tool moreover advantageously comprises a laser for generating a laser beam that by the optical unit having the at least one optical element is capable of being focused, and that, in the state in which the coupling unit is connected to the optical unit, by the optical unit is directable in the beam direction through the liquid chamber of the coupling unit into the nozzle opening, and is capable of being coupled into the liquid jet that is generatable by the nozzle and runs in the beam direction. However, there is also the possibility for the liquid-jet laser machine tool to not have such a laser, but only a port for a laser beam that is generatable by a separate laser. The port herein may be configured variously, depending on requirements. In this way, said port may comprise a window, a lens element, or a mirror, for example, in order for the laser beam to be directed into the liquid-jet laser machine tool, where the laser beam may be guided onward to the machining head. However, the port may also be a coupling location for attaching an optical conductor, in order for the laser beam that has been guided from the separate laser by means of an optical conductor to the liquid-jet laser machine tool to be directed into the liquid-jet laser machine tool, where the laser beam may be guided onward to the machining head.

Independently of whether the liquid-jet laser machine tool comprises a laser, or whether the laser beam is generated by a separate laser and is infed to the liquid-jet laser machine tool through a port, the liquid-jet laser machine tool preferably comprises a collimation unit. This has the advantage that the laser beam may be collimated in an optimal manner, before said laser beam is coupled into the liquid jet in the machining head.

Alternatively thereto, however, there is also the possibility for the liquid-jet laser machine tool to not comprise a collimation unit.

In the case of the liquid-jet laser machine tool comprising a collimation unit, individual optical elements of the collimation unit, or the entire collimation unit, are/is preferably movable both in the beam direction as well as counter to the beam direction. The term "beam direction" herein means that direction in which the laser beam is aligned in the region of the collimation unit. In the case of the laser beam being redirected between the collimation unit and the optical unit of the machining head by a mirror, for example, the beam direction in the region of the collimation unit may also deviate from the beam direction within the machining head. Independently thereof, the mobility of individual elements of the collimation unit or of the entire collimation unit in the beam direction and counter to the latter has the advantage that the laser beam in the machining head may be coupled into the liquid jet in an optimal manner, wherein the optical unit of the machining head does not have any movable optical elements, or at least fewer movable optical elements. This enables the machining head to be constructed in a simpler, smaller, and more compact manner, on account of which the machining head may be manufactured in a more cost-effective manner. Moreover, three-dimensional machining of objects is facilitated by the more compact machining head.

Alternatively thereto, however, there is also the possibility for there to be no optical element of the collimation unit movable either in the beam direction or counter to the beam direction or for the collimation unit to be movable neither in the beam direction nor counter to the beam direction.

In principle, a liquid-jet laser machine tool which comprises a machining head according to the invention, may be configured in an arbitrary manner. However, it is advantageous for the former to be a liquid-jet laser machine tool according to the second invention described hereunder.

The object of the second invention is to achieve a liquid-jet laser machine tool which simplifies coupling the laser beam into the liquid jet. Moreover, it is the object of the second invention to provide a method for focusing a laser beam into a nozzle opening of a nozzle in a liquid-jet laser machine tool of this type. Herein, this method is to likewise facilitate coupling of the laser beam in to the liquid jet.

The achievement of this object is defined by the following features. According to the second invention, the liquid-jet laser machine tool comprises a machining head for coupling a laser beam into a liquid jet, wherein the machining head has a nozzle having a nozzle opening for generating the liquid jet, and the laser beam is capable of being focused by a focusing installation into a port of the nozzle opening for the laser beam to be coupled into the liquid jet. The liquid-jet laser machine tool herein comprises a two-dimensional image sensor for a region of the nozzle around the port of the nozzle opening to be depicted. Moreover, the laser beam is capable of being defocused about a port of the nozzle opening such that laser light from the laser beam is reflected from the region of the nozzle around the port of the nozzle opening toward the image sensor so that a depiction of the region of the nozzle around the port of the nozzle opening is capable of being captured by the image sensor, in which depiction the port of the nozzle opening is identifiable. The liquid-jet laser machine tool advantageously comprises a laser for generating the laser beam. In a likewise advantageous variant, the liquid-jet laser machine tool does not comprise such a laser but a port for a laser beam that is generatable by a separate laser. The port herein may be configured variously, depending on requirements. In this way, said port may comprise a window, a lens, or a mirror, for example, in order for the laser beam to be directed into the liquid-jet laser machine tool, where the laser beam may be guided onward to the machining head. However, the port may also be a coupling location for attaching an optical conductor, in order for the laser beam that has been guided from the separate laser by means of an optical conductor to the liquid-jet laser machine tool to be directed into the liquid-jet laser machine tool, where the laser beam may be guided onward to the machining head.

The method according to the invention for focusing a laser beam into a nozzle opening of a nozzle in a liquid-jet laser machine tool of this type, for coupling the laser beam into a liquid jet that is generated by the nozzle opening comprises a first step in which the laser beam is defocused about a port of the nozzle opening such that laser light from the laser beam is reflected from the region of the nozzle around the port of the nozzle opening toward a two-dimensional image sensor. Herein, a depiction of the region of the nozzle around the port of the nozzle opening is captured by the image sensor, in which depiction the port of the nozzle opening is identifiable. In this context, the laser light of the laser beam being "reflected" by the region of the nozzle around the port of the nozzle opening toward the two-dimensional image sensor is to be understood in a wide meaning. The region of the nozzle around the port of the nozzle opening may be configured so as to be reflective in the sense of a reflecting mirror, for example, reflecting a large proportion of the laser light. However, the region of the nozzle around the port of the nozzle opening may also be configured so as to be only very weakly reflective, or so as to be diffusely scattering, for example. It is sufficient for at least a small proportion of the laser light of the laser beam to be reflected from the region of the nozzle around the port of the nozzle opening to the two-dimensional image sensor. IL is, therefore, sufficient for the region of the nozzle around the port of the nozzle opening to be sufficiently illuminated by the defocused laser beam such that sufficient laser light of the laser beam is returned from the illuminated region of the nozzle around the port of the nozzle opening back to the image sensor such that the port of the nozzle opening can be identified in a depiction of the region of the nozzle around the port of the nozzle opening. The proportion of the returned or reflected laser light, respectively, herein may be large or else only very minor, as long as the port of the nozzle opening can be identified in a depiction of the region of the nozzle around the nozzle opening.

The machining head of this liquid-jet laser machine tool of the liquid-jet laser machine tool employed in this method is advantageously be a machining head according to the first invention described above. On account thereof, the advantages of the first invention and the advantages mentioned in the context of the second invention are achieved. However, the machining head may also be configured in another arbitrary manner, as long as the former has a nozzle having a nozzle opening for generating a liquid jet and serves the purpose of coupling a laser beam into the liquid jet. In this case, the advantages mentioned in the context of the second invention are achieved.

Furthermore, the focusing installation by which the laser beam is capable of being focused into the port of the nozzle opening may be configured in an arbitrary manner and may also comprise a plurality of elements. In this way, said focusing installation may comprise an optical unit, for example, such as the above-described machining head has. However, said focusing installation may also comprise an optical unit of a completely other configuration. Moreover, said focusing installation may for example comprise a collimation unit which serves for the laser beam to be collimated to form a parallel or approximately parallel beam which by the optical unit is capable of being focused into the port of the nozzle opening.

How the laser beam is capable of being defocused from a port of the nozzle opening is irrelevant to the second invention. It is singularly important that the laser beam is capable of being defocused in such a manner that the laser light of the defocused laser beam is reflected from the region of the nozzle around the port of the nozzle opening to the image sensor. Therefore, the liquid-jet laser machine tool may comprise an optical element that is movable into and out of the beam path of the laser beam and that, disposed in the beam path, diffusely scatters the laser beam so as to defocus the laser beam from the port of the nozzle opening, for example. The optical element herein may diffusely transmit or diffusely reflect the laser beam. However, there is also the possibility for the liquid-jet laser machine tool to not have an optical element of this type that diffusely scatters, but for the focal point of the laser beam, when viewed in the beam direction, to be capable of being focused by the focusing installation ahead of or behind the port of the nozzle opening in such a manner that the laser light of the laser beam is defocused from the region of the nozzle around the port of the nozzle opening and is reflected from this region to the image sensor, in order for a depiction of the region of the nozzle around the port of the nozzle opening to be able to be captured by the image sensor, the port of the nozzle opening being identifiable in said depiction.

The depiction that is capable of being captured by the image sensor may be an individual picture or a sequence of pictures as in the case of a motion picture, for example. Accordingly, there are various possibilities for the configuration of the image sensor. In this way, said image sensor may enable individual images to be captured, for example, or a sequence of images, or of motion pictures, respectively, to be captured. The image sensor may be a CCD camera, for example, or another type of camera. Independently of the construction type of the image sensor, it is advantageous for the image sensor to be sensitive to light of the laser light of the laser beam that is reflected by the region of the nozzle around the port of the nozzle opening. This facilitates the identification capability of the port of the nozzle opening in the depiction, since the nozzle opening, as opposed to the surrounding region of the nozzle, does not reflect any laser light of the laser beam. Accordingly, the nozzle opening on account thereof appears as a dark or as a non-illuminated region in the depiction, respectively.

Independently of the specific configuration of the image sensor, the achievement of the second invention has the advantage that the method and the liquid-jet laser machine tool do not require any additional light source by way of which the region of the nozzle around the port of the nozzle opening may be illuminated in order for a depiction of the region of the nozzle around the port of the nozzle opening to be captured by the image sensor. Accordingly, both the liquid-jet laser machine tool as well as the method for focusing the laser beam into the nozzle opening of the nozzle are simplified by way of the achievement.

The liquid-jet laser machine tool preferably comprises a first mirror for the laser beam to be redirected, and a second mirror for the laser beam to be redirected, wherein the first mirror, driven by a first motor, is pivotable only about a first axis, and the second mirror, driven by a second motor, is pivotable only about a second axis, wherein the first axis is aligned with the second axis in such a manner that by way of a pivoting movement of the first mirror about the first axis the laser beam is movable along a first straight line across the region of the nozzle around the port of the nozzle opening, while by way of a pivoting movement of the second mirror about the second axis the laser beam is movable along a second straight line across the region of the nozzle around the port of the nozzle opening, wherein the first and the second straight line are mutually disposed at an angle and therefore intersect. Herein, the straight lines may be entirely straight or have slight curvatures. These curvatures may be caused by distortions in the optics by way of which the laser beam is focused onto the focal point, for example. Independently thereof, the two mirrors having the driven pivoting movements have the advantage that they simplify a controlled movement of the focal point of the laser beam across the region of the nozzle around the port of the nozzle opening, and across the port of the nozzle opening.

In one preferred variant thereof, the first and the second straight line are disposed so as to be substantially mutually perpendicular. This has the advantage that an optimally controlled movement of the focal point of the laser beam across the region of the nozzle around the port of the nozzle opening, and across the port of the nozzle opening is enabled.

In one preferred variant thereof, the liquid-jet laser machine tool comprises a first mirror for the laser beam to be redirected, and a second mirror for the laser beam to be redirected, wherein the first mirror, driven by a first motor, is pivotable only about a first axis, and the second mirror, driven by a second motor, is pivotable only about a second axis, wherein the first axis and the second axis are disposed so as to be substantially mutually perpendicular. This likewise has the advantage that said axes simplify a controlled movement of the focal point of the laser beam across the region of the nozzle around the port of the nozzle opening, and across the port of the nozzle opening.

Alternatively thereto, however, there is also the possibility for the liquid-jet laser machine tool to not comprise any first and second mirror of this type, but for the focal point of the laser beam to be movable across the region of the nozzle around the port of the nozzle opening, and across the port of the nozzle opening, in another manner. In this way, the liquid-jet laser machine tool may also comprise a mirror for the laser beam to be redirected, which, driven by one or two motors, is pivotable about a first axis and about a second axis, wherein the first axis is aligned with the second axis in such a manner that by way of a pivoting movement of the mirror about the first axis the laser beam is movable along a first straight line across the region of the nozzle around the port of the nozzle opening, while by way of a pivoting movement of the mirror about the second axis the laser beam is movable along a second straight line across the region of the nozzle around the port of the nozzle opening, wherein the first and the second straight line are mutually disposed at an angle and therefore intersect.

The focusing installation advantageously comprises a collimation unit for the laser beam to be collimated to form a parallel or approximately parallel beam, and an optical unit for the parallel or approximately parallel beam to be focused onto a focal point. This has the advantage that optimal focusing of the laser beam may be achieved.

Alternatively thereto, however, there is also the possibility for the focusing installation to not have any collimation unit for the laser beam to be collimated to form a parallel or approximately parallel beam. In this way, the focusing installation may comprise only an optical unit for focusing the laser beam, for example. However, said focusing installation may also have an optical unit for focusing the laser beam, and one or a plurality of other optical elements. An alternative of this type has the advantage that the liquid-jet laser machine tool may be constructed in a simpler manner.

In the case of the focusing installation comprising a collimation unit for the laser beam to be collimated to form a parallel or approximately parallel beam, and an optical unit for the parallel or approximately parallel beam to be focused onto a focal point, preferably the entire collimation unit, or preferably individual optical elements of the collimation unit, are movable in order for the collimation of the laser beam to be modified and, on account thereof, for a distance of the focal point of the laser beam from the optical unit to be modified.

In one preferred variant thereof, the entire collimation unit, or individual optical elements of the collimation unit, is/are movable both in the beam direction as well as counter to the beam direction, in order for the collimation of the laser beam to be modified and, on account thereof, for a distance of the focal point of the laser beam from the optical unit to be modified.

In one further preferred variant thereof, the collimation of the laser beam is adjustable in another manner. In this way, the collimation unit may comprise for example at least one deformable lens for the collimation of the laser beam to be modified and, on account thereof, for the distance of the focal point of the laser beam from the optical unit to be modified.

In the three above-mentioned variants, a modification of the collimation means that a shape of the laser beam behind the collimation unit is modified by means of the collimation unit. In this way, the laser beam between the collimation unit and the optical unit may be perfectly collimated, for example, such that the light rays of the laser beam run so as to be exactly mutually parallel. However, the laser beam between the collimation unit and the optical unit may also not be perfectly collimated, such that the light rays of the laser beam run so as to be slightly mutually converging or slightly mutually diverging. In the case of a modification of the collimation of the laser beam, this profile of parallelism, convergence, or divergence of the light rays of the laser beam between the collimation unit and the optical unit is modified. By way of this modification, the distance of the focal point of the laser beam from the optical unit is modified and may be precisely adjusted in the case of a motionless static optical unit. A motionless static optical unit may be used herein. The latter may be constructed in a more compact manner than an optical unit having movable elements for readjusting the distance of the focal point of the laser beam from the optical unit. Such a motionless static optical unit may therefore be placed closer to the port of the nozzle opening. On account thereof, the laser beam may be focused onto a focal point having a smaller diameter measured transversely to the beam direction. Accordingly, the modification of the collimation of the laser beam has the advantage that the laser beam may be coupled into a liquid jet having a smaller cross section. In turn, a smaller cross section of the liquid jet enables more precise machining of objects to be machined.

Alternatively thereto, however, there is also the possibility for the collimation of the laser beam to not be modifiable by means of the collimation unit.

In the case of the collimation of the laser beam being able to be modified by means of the collimation unit for the distance of the focal point of the laser beam from the optical unit to be modified, the focal point of the laser beam is preferably positionable in the port of the nozzle opening, in order for the laser beam for coupling into the liquid jet to be focused into the port of the nozzle opening. Moreover, the focal point of the laser beam is preferably positionable so as to be farther away from the optical unit than from the port of the nozzle opening, in order for the laser beam to be defocused from the port of the nozzle opening such that laser light of the laser beam is reflected from the region of the nozzle around the port of the nozzle to the image sensor, in order for a depiction of the region of the nozzle around the port of the nozzle opening in which the port of the nozzle opening is identifiable is capable of being captured by the image sensor. This has the advantage that the laser beam may be coupled into the liquid jet in a simple manner, and may be defocused in a simple manner in order for a recording of the region of the nozzle around the port of the nozzle opening to be captured by the image sensor.

Alternatively thereto, however, there is also the possibility for the focal point of the laser beam not to be able to be positioned by means of a modification of the collimation of the laser beam in the port of the nozzle opening and for said focal point to be able to be positioned farther away from the optical unit than from the port of the nozzle opening. In this way, the focal point of the laser beam may be positionable in the port of the nozzle opening, and may be positionable so as to be closer to the optical unit than to the port of the nozzle opening, by modifying the collimation of the laser beam, for example. Moreover, there is also the possibility for the entire optical unit or for individual optical elements of the optical unit to be movable in order for the focal point of the laser beam to be positioned in the port of the nozzle opening and so as to be farther away from the optical unit than from the port of the nozzle opening, or so as to be closer to the optical unit than to the port of the nozzle opening.

The method for focusing a laser beam in the nozzle opening of the nozzle in the liquid-jet laser machine tool advantageously comprises a second step in which the nozzle opening in the depiction captured by the image sensor is marked using a marker which is transferable to another depiction captured by the image sensor for establishing the position of the nozzle opening in this other depiction. The marker herein may be a mask that is virtually or physically transferable to another depiction. The marker may however be defined by the coordinates of the position of the nozzle opening in the depiction that is captured by the image sensor, by virtue of which the position of the nozzle opening is establishable in another depiction that is captured by the image sensor. In the case of the image sensor being a CCD camera, the marker may thus be the pixel information of the camera, pertaining to the region in which the nozzle opening is located in the depiction. Independently of the specific form of the marker, this has the advantage that the position of the nozzle opening may be identified by means of the marker in a depiction in which the nozzle opening is not identifiable. Accordingly, this enables the position of the nozzle opening to be established in a depiction that has been captured by the image sensor at a point in time in which the laser beam has not been defocused from the port of the nozzle opening. In the case of the laser beam being focused onto a point on the region of the nozzle around the port of the nozzle opening when this depiction was captured, it may herein moreover be established where the focal point of the laser beam was positioned in relation to the port of the nozzle opening at the point in time when the depiction was captured.

Alternatively thereto, however, there is the possibility for the method not to comprise a second step of this type.

In the case of the method comprising a second step in which the nozzle opening in the depiction captured by the image sensor is marked using a marker which is transferable to another depiction captured by the image sensor for establishing the position of the nozzle opening in this other depiction, the marker is advantageously amended with two straight and perpendicularly intersecting lines, the intersection point thereof being disposed in a center of the nozzle opening. This has the advantage that it may be more readily established in the case of a transfer of the marker to another depiction where the focal point of the laser beam was positioned in relation to the port of the nozzle opening when this other depiction was captured.

In one preferred variant thereof, the marker is amended with one or a plurality of other lines which simplifies/simplify establishing the positioning of the focal point of the laser beam in relation to the port of the nozzle opening in another depiction.

Alternatively thereto, however, there is also the possibility for the marker not to be amended with additional lines.

The method preferably comprises a further step in which the laser beam is focused onto a position on the region of the nozzle around the port of the nozzle opening, and a further depiction of the region of the nozzle around the port of the nozzle opening is captured by the image sensor. Herein, the output of the laser beam is advantageously reduced so as not to damage the region of the nozzle around the port of the nozzle opening by the laser beam. By contrast, in the case of the material of the nozzle around the port of the nozzle opening not being damaged by the focused laser beam at full output, the laser beam may also be focused at full output onto a position on the region of the nozzle around the port. Independently of the output of the laser beam, this step has the advantage that it may be checked by way of capturing one or a plurality of further depictions by the image sensor how well the laser beam is focused onto the region of the nozzle around the port of the nozzle opening. By optionally repeating the step, setting the focal point to a plane that is identical to that of the region of the nozzle around the port of the nozzle opening is enabled. Moreover, the step has the advantage that it may be established how the focal point of the laser beam is positioned in relation to the port of the nozzle opening. Moreover, if and when it is known how the focal point may be moved to a specific distance and in a specific direction across the region of the nozzle around the port of the nozzle opening, on account thereof the focal point of the laser beam in the port may be positioned in the port of the nozzle opening for coupling the laser beam into the liquid jet.

Alternatively thereto, however, there is also the possibility for the method to not comprise any step of this type.

In the case of the method comprising the second step, in which the nozzle opening in the depiction captured by the image sensor is marked using a marker which is transferable to another depiction captured by the image sensor for establishing the position of the nozzle opening in this other depiction, and the marker is amended with two straight and perpendicularly intersecting lines, the intersection point thereof being disposed in a center of the nozzle opening, and of the method comprising the further step in which the laser beam is focused onto a position on the region of the nozzle around the port of the nozzle opening, and a further depiction of the region of the nozzle around the port of the nozzle opening is captured by the image sensor, the method advantageously has the following three further steps. First, the focal point of the laser beam is positioned on a first of the perpendicularly intersecting lines, and the first positioning parameters used therefor are stored. Thereafter, the focal point of the laser beam is positioned on a second of the perpendicularly intersecting lines, and the second positioning parameters used therefor are stored. Thereafter, based on the stored first and second positioning parameters, the focal point of the laser beam is positioned in the port of the nozzle opening. In the case of these three steps, the positioning of the focal point may in each case be checked by capturing one or a plurality of further depictions by the image sensor. The advantage of the three steps is that the focal point of the laser beam may be optimally positioned in a simple manner in the port of the nozzle opening for coupling the laser beam into the liquid jet.

Alternatively thereto, however, there is also the possibility of the method to not have such three steps.

In the case of the laser machining device used comprising a first mirror for the laser beam to be redirected, and a second mirror for the laser beam to be redirected, wherein the first mirror, driven by a first motor, is pivotable only about a first axis, and the second mirror, driven by a second motor, is pivotable only about a second axis, one of the perpendicularly intersecting lines preferably corresponds to the motion path along which the focal point of the laser beam is movable by pivoting the first mirror about the first axis, while the other of the perpendicularly intersecting lines corresponds to the motion path along which the focal point of the laser beam is movable by pivoting the second mirror about the second axis. In this case, the first and the second positioning parameters are preferably the pivoting angles or the orientation, respectively, of the first and the second mirror about the first and the second axis, respectively.

Alternatively thereto, however, there is also the possibility for the intersecting lines not to correspond to these motion paths.

Further advantageous embodiments and combinations of features of the invention are derived from the following detailed description and from the entirety of the patent claims.

BRIEF DESCRIPTION OF THE DRAWINGS

In the drawings used for explaining the exemplary embodiment.

In principle, same parts are provided with the same reference signs in the figures.

WAYS OF EMBODYING THE INVENTION

Figure 1:
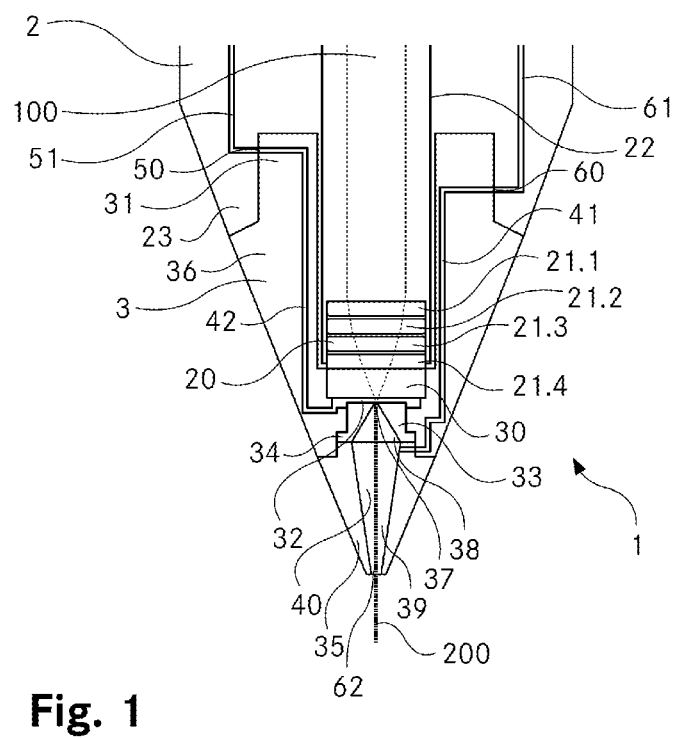
FIG. 1 shows a schematic illustration of a cross section through a machining head according to the invention, along a central axis of the machining head.

FIG. 1 shows a schematic illustration of a cross section through a machining head 1 according to the invention, along a central axis of the machining head 1. This central axis in FIG. 1 runs from top to bottom in the plane of the illustration.

The machining head 1 is associated to a liquid-jet laser machine tool (not shown in more detail herein). This liquid-jet laser machine tool comprises a laser which may generate a laser beam, or else a port through which a laser beam that is generated by a separate laser may be guided into the liquid-jet laser machine too. In both cases, the laser beam 100 is guided in the liquid-jet laser machine tool for being coupled therein into a liquid jet 200.

The laser beam 100 in the cross-sectional illustration of FIG. 1 is illustrated with dashed lines. Said laser beam 100 runs from top to bottom along the central axis of the machining head 1 into the machining head 1, and in the machining head 1 is coupled into the liquid jet 200 which exits from the machining head 1 at the tip of the machining head 1, along the central axis of the machining head 1. Therefore, the beam direction in the illustration plane in FIG. 1 also runs from top to bottom.

The machining head 1 comprises an optical unit 2 and a coupling unit 3. The optical unit 2 has a front end which in the illustration shown in relation to the remaining optical unit 2 is located below. The external shell of the front end is cylindrical, wherein the rotational-symmetrical axis of the cylinder-shell shape runs along the central axis of the machining head 1, or along the central axis of the optical unit 2. A lens 20 which comprises four lens elements 21.1, 21.2, 21.3, 21.4 is located inside the front end of the optical unit 2. The last lens element 21.4 when viewed in the beam direction forms a termination of the front end of the optical unit 2. Thus, this last lens element 21.4 when viewed in the beam direction is the last optical element of the optical unit 2 when viewed in the beam direction.

The cylinder-shell shape of the front end of the optical unit 2 is formed substantially by a front region of a lance 22 in which the laser beam 100, coming from the remaining liquid-jet laser machine tool, is guided into the machining head 1. The lens 20 is disposed at the front end of this lance 22, and serves for focusing the laser beam 100 onto a focal point ahead of the optical unit 2. The diameter of this focal point is in the range from 25 µm to 40 µm.

The coupling unit 3 comprises a main body 36, a transparent element 30, a replaceable nozzle block 33, and a replaceable head-tip unit 35. In the fitted state of the machining head 1, the coupling unit 3 is connected to the optical unit 2, as is shown in FIG. 1. Herein, said coupling unit 3 by way of the main body 36 thereof encloses the front end of the optical unit 2 having the lens 20, and counter to the beam direction reaches rearward up to behind the lens 20. In order for this to be enabled, the main body 36 has cavity which is open on one side and has a circular cross section. A transparent element 30 for being able to admit the laser beam 100 which exits the optical unit 2 through the last lens element 21.4 of the lens 20 in the beam direction into the coupling unit 3 is located on the base of this cavity. Laterally, the cavity is closed by a tubular wall 31 having a circular cross section. The external side of the wall 31 that faces away from the cavity indeed has a likewise circular cross section. By contrast to the internal side, the diameter of the cross section of the external side is not identically sized throughout. The diameter of the cross section of the external side is constant only in one region of an end of the wall 31 that in the fitted state of the machining head 1 faces the optical unit 2. Therefore, the external side of the end of the wall 31 in this region has a cylinder-shell shape. Viewed from that end of the wall 31 that faces the optical unit 2, the diameter of the cross section of the external side of the wall 31, following this cylindrical region, initially increases so as to subsequently taper off so as to form a tip.

The optical unit 2, at the proximal end of the front end thereof, has an annular groove that encircles the front end. Herein, an external periphery of this groove forms a ferrule 23. If and when the coupling unit 3 is connected to the optical unit 2, the open side of the cavity in the main body 36 of the coupling unit 3 is aligned counter to the beam direction, and the main body 36 is push-fitted over the front end of the optical unit 2 such that the front end of the optical unit 2 is located in the cavity of the main body 36. That region of the end of the wall 31 of the main body 36 that in the fitted state of the machining head 1 faces the optical unit 2 herein is located in the groove and is surrounded by the ferrule 23.

The ferrule 23 of the optical unit 2 has an external side which when viewed in the beam direction tapers off in a conical manner. This external side at the front end of the ferrule 23 transitions into the conically tapering-off region of the external side of the wall 31 of the main body 36. On account thereof, the ferrule 23 and the main body 36 conjointly form a cone which tapers off in the beam direction. The cone-opening angle of this cone, measured between a rotationally symmetrical central axis of the cone and the external area of the cone, is 23°. However, this cone-opening angle may also be smaller or larger. In this way, said cone-opening angle may be 20° or less, for example. Depending on the embodiment, said cone-opening angle may however also be 30°, 45°, 60°, or more than 60°.

As has already been mentioned, the element 30 which is transparent to the laser light of the laser beam 100 is located on the base of the cavity of the main body 36 that is open on one side. This transparent element 30 is disk-shaped and by way of the two main areas thereof is aligned perpendicularly to the central axis of the machining head 1, or to the central axis of the coupling unit 3, respectively. One of the main areas of the transparent element 30 forms a majority of the base of the cavity of the main body 36 that is open on one side. By contrast, the other main area of the transparent element 30 closes off a liquid chamber 32 that is disposed in the main body 36 in relation to the cavity. This liquid chamber 32 is likewise disk-shaped, and by way of the two main areas thereof is aligned perpendicularly to the central axis of the coupling unit 3. A replaceable nozzle block 33 closes off the liquid chamber 32 on that side that is opposite the transparent element 30. This replaceable nozzle block 33 forms the nozzle for generating the liquid jet 200. Said nozzle block 33 in terms of the basic shape thereof is cylindrical, and on the two ends thereof that lie on the rotationally symmetrical axis thereof has flat main areas. A ring, the diameter of which measured perpendicularly to the rotationally symmetrical axis is larger than the diameter of the remaining basic cylindrical shape is disposed on one of these two ends, so as to be concentric with the basic cylindrical shape. Therefore, if and when the nozzle block 33 is inserted into the main body 36 of the coupling unit 3, this ring forms a detent 34, enabling the nozzle block 33 to be correctly positioned in the main body 36. By virtue of this detent 34, the nozzle block 33 is substantially hat-shaped.

On that main area of the nozzle block 33 that is opposite the detent 34, the nozzle block 33 has a nozzle opening 37 which has a diameter of 70 μm, and which runs along the rotationally symmetrical axis of the nozzle block 33. In the fitted state of the machining head 1, this main area of the nozzle block 33 faces the liquid chamber 32, and the rotationally symmetrical axis of the nozzle block 33 runs along the central axis of the machining head 1, or along the central axis of the coupling unit 3, respectively. On account thereof, the nozzle opening 37 in the fitted state of the machining head 1 runs along the central axis of the machining head 1. Herein, the nozzle opening 37 however does not reach through the entire nozzle block 33 but, when viewed in the beam direction, transitions into an opening 38 which opens out in a conical manner and which reaches through the nozzle block 33 up to that main area of the nozzle block 33 that has the detent 34. On account thereof, the nozzle block 33 enables a liquid jet 200 which is directed along the central axis of the machining head 1 and thus exits the nozzle block 33 in the beam direction through the opening 38 that opens up in a conical manner to be generated through the nozzle opening 37 with the liquid from the liquid chamber 32. In the present case, the liquid used herein is water. However, a liquid other than water may also be used.

As has already been mentioned, the laser beam 100 during operation of the machining head 1 is focused by the lens 20 of the optical unit 2 onto a focal point ahead of the optical unit 2. The focal point herein is positioned in such a manner that it lies in the starting region of the nozzle opening 37. On account thereof, the laser beam 100 is focused into the liquid jet 200 that is generated by the nozzle opening 37, and is coupled into the liquid jet 200, where said laser beam 100 by virtue of a total reflection on the surface of the liquid jet 200 remains coupled into the latter.

In order for the liquid chamber 40 and thus also the liquid jet 200 to be supplied with liquid, the optical unit 2 has a liquid duct 51 which is connected to a liquid source (not shown here). This liquid duct 51 leads to the internal side of the ferrule 23 of the optical unit 2, where the former terminates in an opening. In the fitted state of the machining head 1, this opening of the liquid duct 51 in the optical unit 2 lies on an opening in that end of the coupling unit 3 that faces the optical unit 2. This opening in the coupling unit 3 forms the port to a further liquid duct 42 which leads through the main body 36 of the coupling unit 3 to the liquid chamber 32. On account thereof, the two openings in the optical unit 2 and the coupling unit 3 that lie on top of one another form a liquid interface 50 by way of which the liquid chamber 32 may be supplied with liquid from the optical unit 2. Accordingly, the liquid jet 200 may also be supplied with liquid by way of the liquid interface 50.

Liquid which is directed into the opening in the coupling unit 3 is dispensed through the opening in the optical unit 2 at the liquid interface 50. Herein, the opening in the optical unit 2 is disposed on the internal side of the ferrule 23 which has the shape of an internal side of a cylinder-shell area. The rotationally symmetrical axis of this cylinder-shell area is congruent with the central axis of the optical unit 2 and thus with the central axis of the machining head 1. This cylinder-shell area in the fitted state of the machining head 1 is thus aligned so as to be parallel with the beam direction. By contrast, the opening in the coupling unit 3 is disposed on the external side of that end of the coupling unit 3 that faces the optical unit 2. This external side has a shape of the external side of a cylinder-shell area, the rotationally symmetrical axis of which corresponds to the central axis of the coupling unit 3. Therefore, this cylinder-shell area is also aligned so as to be parallel with the beam direction if and when the machining head 1 is fitted.

A liquid-interface area of the liquid interface 50 is defined by those regions of the cylinder-shell-shaped areas that lie around that opening in the optical unit 2 that is associated with the liquid interface 50, and that opening in the coupling unit 3 that is associated with the liquid interface 50. Herein, the liquid-interface area, proceeding from those regions of the cylinder-shell-shaped areas that lie around the openings, steadily runs onward across the region of the openings. Therefore, the liquid-interface area also lies on a cylinder-shell area of which the rotationally symmetrical axis corresponds to the central axis of the coupling unit 3. However, the liquid-interface area herein is limited to the region of the openings, because the liquid interface 50 is limited to this region. Nevertheless, the liquid-interface area is aligned so as to be parallel with the beam direction.

Since the liquid interface 50, in the fitted state of the machining head 1 and when viewed in the beam direction, is located so as to be level with the ferrule 23 of the optical unit 2, the laser beam 100, before passing the lens 20 of the optical unit 2, passes the liquid interface 50. Accordingly, the liquid interface 50, when viewed in the beam direction, is located ahead of the last lens 21.4 of the lens 20 when viewed in the beam direction.

The head-tip unit 35 of the coupling unit 3 has a substantially conical external shape. Moreover, said head-tip unit 35 in the interior thereof has an opening 39 which along the longitudinal axis of the latter is continuous through the head-tip unit 35, and likewise has a conical shape. If and when the machining head 1 is assembled, the head-tip unit 35 is fitted to the main body 36 of the coupling unit 3. Herein, the head-tip unit 35 by way of the longitudinal axis thereof runs along the central axis of the machining head 1, and by way of the conical external shape of the former forms the tip of the cone that is formed by the ferrule 23 and the main body 36. In the interior, the conical opening 39 is aligned in such a manner that it tapers off in the direction of the tip of the external shape.

In the fitted state of the machining head 1, the head-tip unit 35 by way of that end thereof that faces the main body 36 of the coupling unit 3 holds the nozzle block 33 in the position thereof in the main body 36 of the coupling unit 3. Herein, that side of the opening 39 that faces the nozzle block 33 is located in the head-tip unit 35, directly on that opening 38 in the nozzle block 33 that opens in a conical manner. On account thereof, the opening 38 in the nozzle block 33 and the opening 39 in the head-tip unit 35 form a cavity in the machining head 1 that in a sectional plane along the central axis of the machining head 1 has a substantially rhombus-shaped cross section. This cavity forms a gas back-pressure chamber 40. During operation of the machining head 1, the liquid jet 200 that is generated by the nozzle opening 37 runs through this gas back-pressure chamber 40, and exits the machining head 1 through the tapered-off side of the conical opening 39 in the head-tip unit 35. However, the liquid jet 200 herein does not contact the periphery of the tapered-off side of the opening 39 but leaves a small gap all around. Gas from the gas back-pressure chamber 40 may exit through this gap, so as to form a gas jet that envelops the liquid jet 200. Therefore, the tapered-off side of the conical opening 39 in the head-tip unit 35 forms a gas-exit nozzle 62. The gas jet that is generated by this gas-exit nozzle and that envelops the liquid jet 200 serves for stabilizing the liquid jet 200 such that the latter is stable across a comparatively long distance as from the head-tip unit 35, becoming instable only thereafter and disintegrating into individual drops. On account thereof it is enabled that the laser beam 100 remains coupled into the liquid jet 200 across a longer distance.

In order for the gas back-pressure chamber 40 to be supplied with gas, the optical unit 2 has a gas duct 61 which is connected to a gas source (not shown here). This gas duct 61 leads to an internal side of the ferrule 23 of the optical unit 2, where the former terminates in an opening. In the fitted state of the machining head 1, this opening of the gas duct 61 in the optical unit 2 lies on an opening in that end of the coupling unit 3 that faces the optical unit 2. This opening in the coupling unit 3 forms the port to a further gas duct 41 which leads through the main body 36 of the coupling unit 3 and through the head-tip unit to the opening 39 in the head-tip unit 35. On account thereof, the two openings in the optical unit 2 and the coupling unit 3 that lie on top of one another form a gas interface 60 by way of which the gas back-pressure chamber 40 may be supplied with gas from the optical unit 2. Accordingly, the gas jet may also be supplied with gas by way of the gas interface 60.

A gas-interface area of the gas interface 60 is defined by those regions of the cylinder-shell-shaped areas that lie around that opening in the optical unit 2 that is associated with the gas interface 60, and that opening in the coupling unit 3 that is associated with the gas interface 60. Herein, the gas-interface area, proceeding from those regions of the cylinder-shell-shaped areas that lie around the openings, steadily runs onward across the region of the openings. Therefore, the gas-interface area also lies on a cylinder-shell area of which the rotationally symmetrical axis corresponds to the central axis of the coupling unit 3. However, the gas-interface area herein is limited to the region of the openings, because the gas interface 60 is limited to this region. Nevertheless, the gas-interface area is aligned so as to be parallel with the beam direction.

Since the gas interface 60, in the fitted state of the machining head 1 and when viewed in the beam direction, is located so as to be level with the ferrule 23 of the optical unit 2, the laser beam 100, before passing the lens 20 of the optical unit 2, passes the gas interface 60. Accordingly, the gas interface 60, like the liquid interface 50, when viewed in the beam direction, is located ahead of the last lens 21.4 of the lens 20 when viewed in the beam direction.

This arrangement of the gas interface 60 and of the liquid interface 50 enables a construction of the machining head 1 in which the external shape of the optical unit 2 and of the coupling unit 3, when viewed in the beam direction, is pointed. This allows the machining head 1 to be inclined in relation to an object to be machined and nevertheless the object to be reached by the stable region of the liquid jet 200, without the machining head 1 colliding with the object. Accordingly, three-dimensional machining of objects is facilitated by this arrangement. Moreover, the arrangement of the lens 20 behind the liquid interface 50, when viewed in the beam direction, and of the gas interface 60 at the front end of the optical unit 2, allows focusing of the laser beam 100 to be performed just short of the nozzle opening 37. On account thereof, the lens may have a short focal length, and may nevertheless focus the laser beam onto the focal point in the port region of the nozzle opening 37. This enables that the laser beam 100 may be focused onto a focal point having a small diameter. Accordingly, this construction of the machining head 1 enables that the laser beam 100 may be coupled into a liquid jet 200 having a small diameter.

Even if both the liquid interface 50 as well as the gas interface 60 are located ahead of the last lens 21.4 of the lens 20 when viewed in the beam direction, the gas interface 60, when viewed in the beam direction, is not always disposed so as to be level with the liquid interface 50, but when viewed in the beam direction is somewhat behind the liquid interface 50. On account thereof, it is enabled that the gas interface 60 and the liquid interface 50 may be mutually separated by means of a seal. To this end, the cylinder-shell-shaped region of that end of the coupling unit 3 that in the fitted state of the machining head 1 faces the optical unit 2 has three concentrically encircling annular seals (not shown in FIG. 1). A first of these annular seals runs ahead of the liquid interface 50, when viewed in the beam direction, while a second of these annular seals runs between the liquid interface 50 and the gas interface 60, and while the third of the annular seals, when viewed in the beam direction, is disposed behind the gas interface 60. On account thereof, the liquid interface 50 and the gas interface 60 are mutually separated such that no liquid can makes its way from the liquid interface 50 to the gas interface 60, and no gas can make its way from the gas interface 60 to the liquid interface 50. Moreover, on account thereof, the liquid interface 50 and the gas interface 60 are also sealed in relation to the outside, such that neither liquid nor gas may escape between the optical unit 2 and the coupling unit 3.

Figure 2:
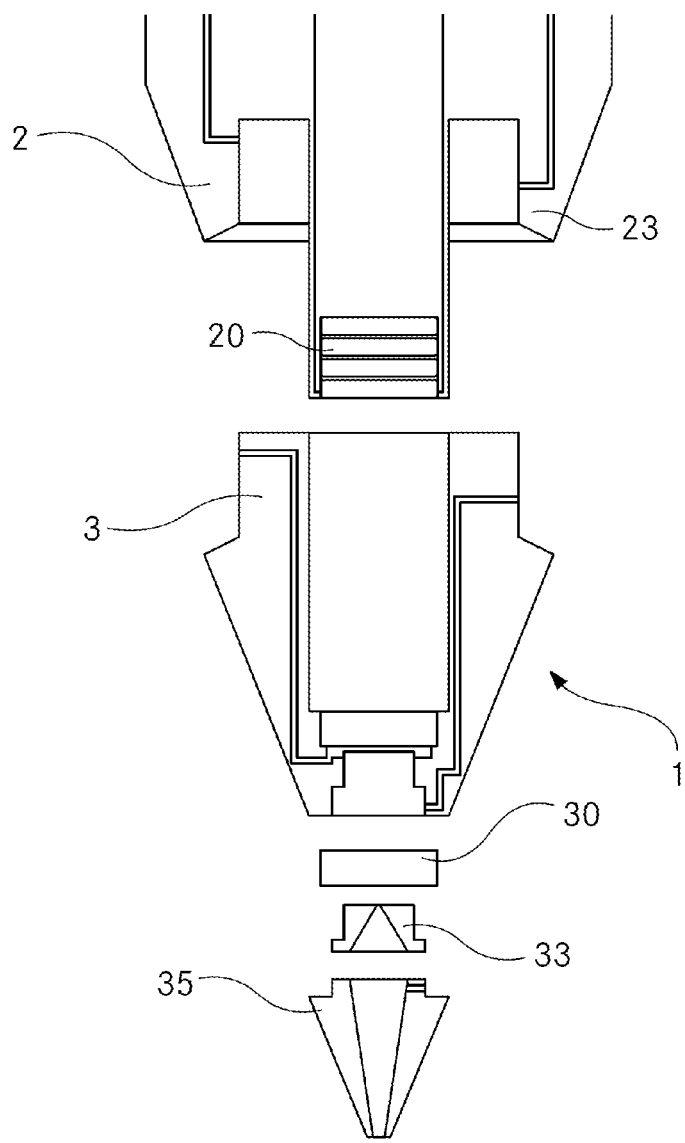
FIG. 2 shows a schematic exploded illustration of the cross section through the machining head.

In a manner similar to FIG. 1, FIG. 2 shows a schematic illustration of a cross section through the machining head 1, along a central axis of the machining head 1. However, as opposed to FIG. 1, an exploded illustration is shown in FIG. 2. On account thereof, the optical unit 2 having the ferrule 23 and the front end having the lens 20 can be identified as a separate element of the machining head 1. Moreover, on account thereof, the main body 36 of the coupling unit 3, and the transparent element 30, the nozzle block 33, and the head-tip unit 35, can also be seen as separate elements.

Figure 3:
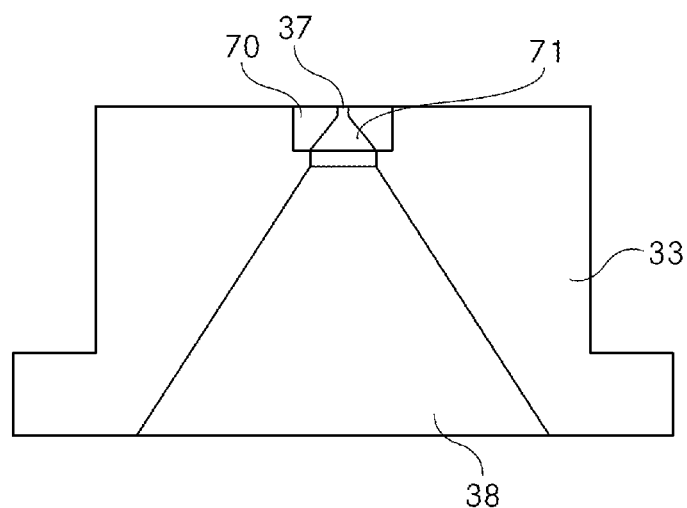
FIG. 3 shows a schematic illustration of a cross section through a nozzle block.

FIG. 3 shows a schematic illustration of a cross section through the nozzle block 33. By way of the illustration that is enlarged in comparison with FIGS. 1 and 2, details of the nozzle block 33 can be seen in FIG. 3. In this way, it can be seen that the nozzle opening 37 is located in an insert 70 which is recessed in the respective main area of the nozzle block 33. This insert 70 is cylindrical. The nozzle opening 37 which along the rotationally symmetrical axis of the insert 70 transitions to an opening 71 in the insert 70 that opens in a conical manner is disposed in one of the two main areas of said insert 70. If and when the insert 70 is recessed in the remaining nozzle block 33, as is illustrated here, the conical opening 71 of the insert 70 transitions to the conical opening 38 of the nozzle block 33.

The first invention is not limited to the exemplary embodiment shown in FIGS. 1 to 3. Various deviations from this exemplary embodiment are possible. In this way, the external shape of the machining head may be other than conical, for example. Moreover, both the optical unit as well as the coupling unit may be shaped in another manner. Furthermore, the liquid interface and the gas interface may be disposed elsewhere and be shaped in another manner. In this way, said interfaces may be disposed at the outermost end of that end of the coupling unit that faces the optical unit, for example. Moreover, the interface area may also be aligned at an angle in relation to the beam direction, for example, or lie in a plane that is aligned perpendicularly to the beam direction.

Furthermore, the profile of the liquid duct and of the gas duct within the optical unit and within the coupling unit may run in another manner. In this way, there is the possibility for the gas duct to be routed not from the main body of the coupling unit via the head-tip unit, but instead via the nozzle block, or from the main body of the coupling unit directly to the gas back-pressure chamber, for example. There is also the possibility for the coupling unit to have no replaceable head-tip unit.

Independently of these variants, the machining head may also be viable without a gas back-pressure chamber. In this case, the gas duct may be connected directly to the gas-exit nozzle, for example. However, there is also the possibility for the machining head to be unable to generate any gas jet that envelops the liquid jet at all. In this case, neither a gas duct, a gas interface, a gas back-pressure chamber, nor a gas-exit nozzle are required.

There is furthermore the possibility for the nozzle block to be constructed in another manner. For example, said nozzle block may be shaped in another manner. Said nozzle block may also be integrally made and thus be without an insert. Furthermore, there is also the possibility for the nozzle opening to have another diameter than 70 μm. In this way, the nozzle opening may have a diameter in the range from 20 μm to 150 μm, for example. This diameter may however also be 20 μm or less, or else 150 μm or more. Likewise, the diameter of the focal point of the laser beam 100 may deviate from the range of 25 μm to 40 μm.

Figure 4:
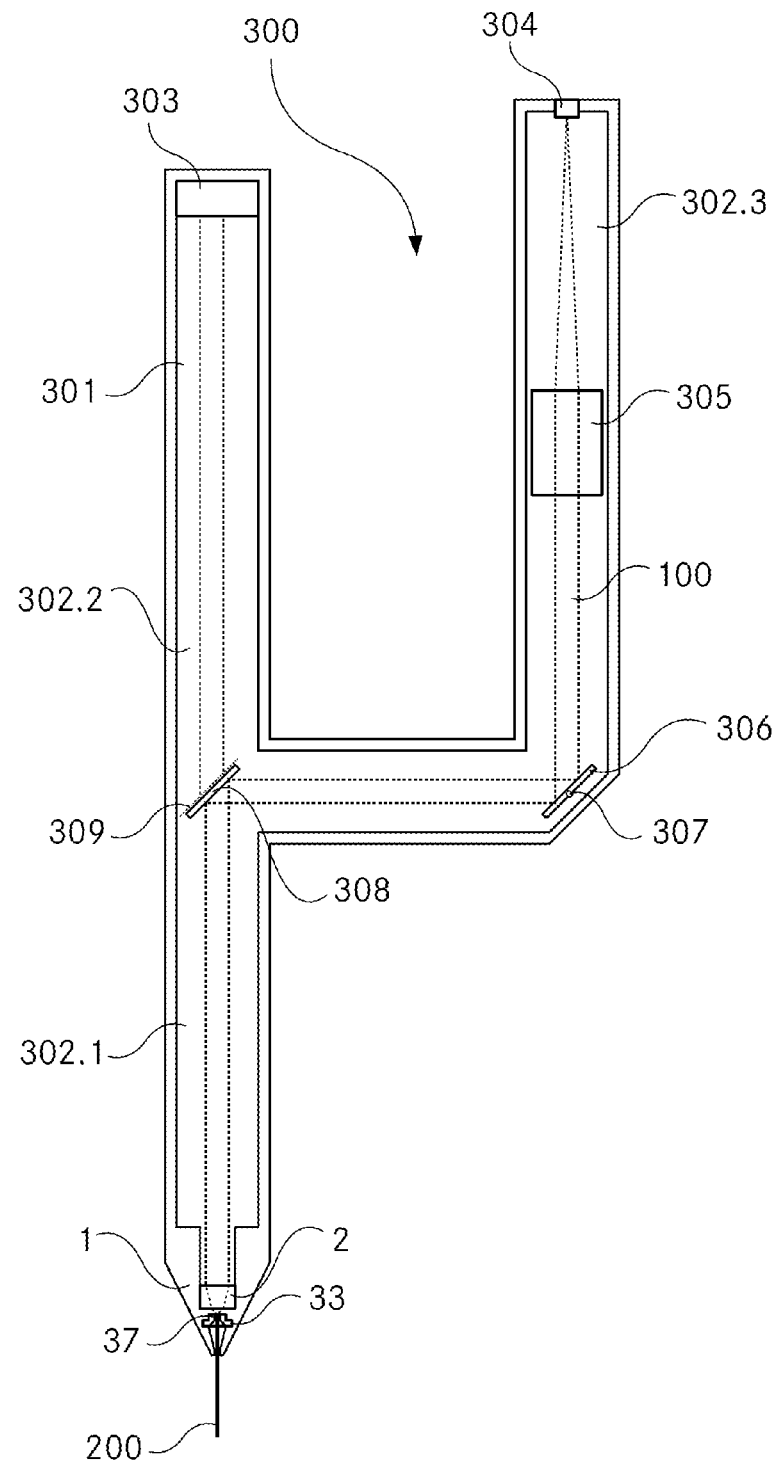
FIG. 4 shows a schematic illustration of a cross section through a liquid-jet laser machine tool according to the invention, having the machining head.

FIG. 4 shows a schematic illustration of a cross section through a liquid-jet laser machine tool 300 according to the second invention. The cross section shown runs along the beam path of the laser beam 100, Accordingly, the beam path of the laser beam 100 runs substantially in the illustration plane. Herein, the liquid-jet laser machine tool 300 is illustrated as being aligned in such a manner that top and bottom in the illustration correspond to top and bottom in the case of the liquid-jet laser machine tool 300.

The liquid-jet laser machine tool 300 comprises a lance 301 which encloses the beam path of the laser beam 100. This lance 301 has three arms 302.1, 302.2, 302.3 which are interconnection by a junction. The free end of the first arm 302.1 of the lance 301 is formed by a machining head 1 according to the first invention. In the present case, this herein is the machining head 1 that has been described in detail by means of FIGS. 1 to 3. By contrast, the machining head 1 in the present FIG. 4 is illustrated in a very simplified manner, wherein a correct proportioning of the illustrated elements has been dispensed with. The free end of the second arm 302.2 of the lance 301 forms a termination of the beam path of the laser beam 100. A CCD camera 303 which is sensitive to light having the wavelength of the laser beam 100 is disposed as an image sensor on the internal side of this termination. The free end of the third arm 302.2 of the lance 301 is indeed also connected, but has a port 304. The laser beam 100 of the liquid-jet laser machine tool 300, that is generated by a laser that is separate from the liquid-jet laser machine tool 300 is infed through this port 304 by means of a glass fiber (not shown here) or by means of a hollow conductor (not shown here). However, in a modification of this embodiment, the liquid-jet laser machine tool 300, instead of the port 304, may also comprise a dedicated laser for generating the laser beam 100.

The free end of the third arm 302.3 points upward such that the port 304 is open toward the top. Therefore, the laser beam 100 is infed from top to bottom through the port 304 of the liquid-jet laser machine tool 300. The beam direction of the laser beam 100 within this free end of the third arm 302.3 thus runs from top to bottom. The laser beam 100 herein runs through a collimation unit 305 which collimates the laser beam 100. In order for this collimation of the laser beam 100 to be modified, the collimation unit 305 may be moved in the beam direction or counter to the beam direction. Therefore, the laser beam 100 after the collimation unit 305 may be perfectly collimated by way of suitably positioning the collimation unit 305 such that the light rays of the laser beam 100 after the collimation unit 305 run so as to be exactly mutually parallel, for example. However, the collimation unit 305 may also be positioned in another manner such that the laser beam 100 after the collimation unit 305 is not perfectly collimated but such that the light rays of the laser beam 100 run so as to be slightly mutually converging or slightly mutually diverging. Therefore, the parallelism, convergence, or divergence of the light beams of the laser beam 100 after the collimation unit 305 may be set according to requirements by suitably positioning the collimation unit 305 in the lance 301.

The third arm 302.3 of the lance 301, when viewed in the beam direction, after the collimation unit 305 has a rectangular kink, the lance 301 thereafter running in the horizontal direction. A first mirror 306 which reflects the laser beam 100 such that the laser beam 100 after the first mirror 306 runs onward in the horizontal region of the lance 301 is disposed in this kink. The first mirror 306, driven by a motor not shown here, is pivotable about a first axis 307. This first axis 307 is horizontally aligned and points vertically out of the illustration plane. Therefore, the first axis 307 is aligned perpendicularly to the beam direction of the laser beam 100 ahead of and behind the first mirror 306. Therefore, by setting the orientation of the first mirror 306 about the first axis 307, the beam direction of the laser beam 100 after the first mirror 306 may be aligned so as to be exactly horizontal or be inclined slightly upward or slightly downward.

The horizontally running region of the third arm 302.3 of the lance 301, proceeding from the kink in the third arm 302.3, runs to the junction in the lance 301. Proceeding from this junction, the first arm 302.1 of the lance 301 runs vertically downward, and the second arm 302.2 of the lance 301 runs vertically upward. A second mirror 308 which reflects the laser beam 100 such that the laser beam 100 after the second mirror 308 in the first arm 302.1 of the lance 301 runs onward in a downward direction is disposed in the junction. The second mirror 308, driven by a motor not shown here, is pivotable about a second axis 309. This second axis 309 lies in the illustration plane and is thus aligned perpendicularly to the first axis 307. Said second axis 309 points at an angle of 45° from obliquely below to obliquely above, approximately in the direction of the free end of the third arm 302.3 of the lance 301. By setting the orientation of the second mirror 308 about the second axis 309, the beam direction of the laser beam 100 after the second mirror 308 may be aligned. This enables the beam direction of the laser beam 100 after the second mirror 308 to be held exactly in the illustration plane or to be inclined slightly out of the illustration plane toward the observer or away from the observer, depending on the requirements.

In the machining head 1, the laser beam 100 is focused onto a focal point by the optical unit 2 in the free end of the first arm 302.1 of the lance 301 that runs vertically downward in the machine. Therefore, by setting the orientation of the second mirror 308 about the second axis 309, a position of the focal point of the laser beam 100 may be set in a direction that is perpendicular to the illustration plane. Moreover, by setting the orientation of the first mirror 306 about the first axis 307, a position of the focal point may be set in a direction that is perpendicular to the alignment of the first arm 302.1 of the lance 301 and that runs so as to be parallel with the illustration plane. Thus, the two mirrors 306, 308 enable positioning of the laser beam 100 in the machining head 1 in a plane that is perpendicular to the alignment of the first arm 302.1.

Since the optical unit does not comprise any movable elements, a spacing of the focal point of the laser beam 100 from the optical unit 2 depends on the collimation of the laser beam 100 directly ahead of the optical unit 2. Therefore, the positioning of the collimation unit 305 in the third arm 302.3 not only enables the setting of the collimation of the laser beam 100 after the collimation unit 305, but also setting of the spacing of the focal point of the laser beam 100 from the optical unit 2.

In the case of the focal point of the laser beam 100, when viewed on the beam direction, being positioned significantly ahead of or behind that wall of the replaceable nozzle block 33, or of the nozzle, respectively, that faces the optical unit 2, the laser beam 100 is defocused from the port of the nozzle opening 37 such that laser light of the laser beam 100 is reflected from the region of the nozzle around the port of the nozzle opening 37. This reflected light is returned by the optical unit 2 into the first arm 302.2 of the lance 301, where said reflected light meets the second mirror 308 which at least partially transmits the reflected light. Therefore, at least part of the reflected light makes its way into the second arm 302.2 of the lance 301, the former meeting the CCD camera 303 at the free end of said lance 301. In order for this to be enabled, the second mirror 308 may be semi-transparent, for example. However, the second mirror 308 may also reflect light of the one polarization direction, and transmit light of the other polarization direction, for example. In this case, the laser light of the laser beam 100 may be infed so as to be already polarized through the port 304 of the liquid-jet laser machine tool 300, or else be polarized in the third arm 302.1 of the lance 301, for example. If and when the polarization of the laser light herein is suitably chosen, the laser beam 100 is reflected from the second mirror 308 to the machining head 1. Moreover, if and when a lambda quarter plate (not shown here) is installed in the first arm 302.1 of the lance 301, the light of the laser beam 100 that is reflected from the second mirror 308 runs through into the first arm 302.1 of the lance 301, and from the region of the nozzle around the port of the nozzle opening 37 back to the second mirror 308, runs twice through said lambda quarter plate. On account thereof, this reflected light is repolarized in the first arm 302.1. This leads to said reflected light now being transmitted through the second mirror 308 and being able to reach the CCD camera 303. Therefore, if and when in the case of a laser which is defocused from the port of the nozzle opening 37 a depiction is captured by the CCD camera 303, the port of the nozzle opening 37 in this depiction can be identified as a non-illuminated spot. In order for the contour of the port of the nozzle opening 37 to be clearly identified in this depiction, the CCD camera 303 may moreover have a suitable lens which may be movable.

By contrast, in the case of the focal point of the laser beam 100, when viewed in the beam direction, is positioned on a plane that is defined by that wall of the replaceable nozzle block 33, or of the nozzle, respectively, that faces the optical unit 2, and in this plane is positioned in the port of the nozzle opening 37, the laser beam 100 is coupled into the liquid jet 200 that is generated by the nozzle. The liquid jet 200 in the present exemplary embodiment is a water jet. However, there is also the possibility for any other liquid than water to be used for generating the liquid jet 200.

The method according to the invention, by way of which the focal point of the laser beam 100 may be positioned in this way is explained hereunder.

FIGS. 5a to 5f illustrate an embodiment of the method according to the second invention, for focusing the laser beam 100 into the nozzle opening 37 of the nozzle of the liquid-jet laser machine tool 300, for coupling the laser beam 100 into the liquid jet 200 that is generated by the nozzle opening 37.

Figure 5A:
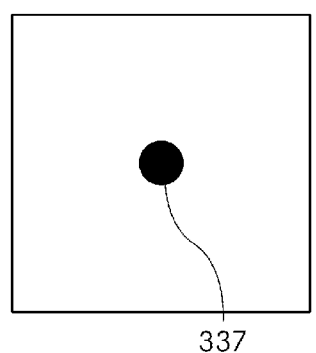
FIGS. 5a-f show schematic illustrations of depictions captured by a CCD camera, for illustration of the method according to the invention for focusing a laser beam into a nozzle opening of a nozzle of the liquid-jet laser machine tool, for coupling the laser beam into a liquid jet that is generated by the nozzle opening.

In this method, in a first step the laser beam 100 is defocused from the port of the nozzle opening 37 in that the collimation unit 305 is positioned in the third arm 302.3 of the lance 301 in such a manner that the focal point, when viewed in the beam direction, is located behind the nozzle. While the nozzle is illuminated by the defocused laser beam 100, a recording of the region of the nozzle around the port of the nozzle opening 37 is captured by the CCD camera 303. FIG. 5a shows a schematic illustration of such a recording in which the port of the nozzle opening 37 can be identified as a non-illuminated dark spot 337.

Figure 5B:
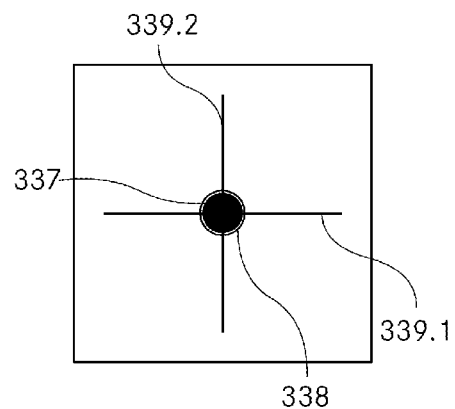

In a second step, the contour of this spot 337 in the depiction is marked with a marker 338. As is illustrated in FIG. 5b, this marker 338 is amended by two straight lines 339.1, 339.2 that intersect one another in a perpendicular manner in the center of the spot 337. The marker herein is stored in an intermediate memory such that the former may be transferred to other depictions of the CCD camera 303.

Figure 5C:
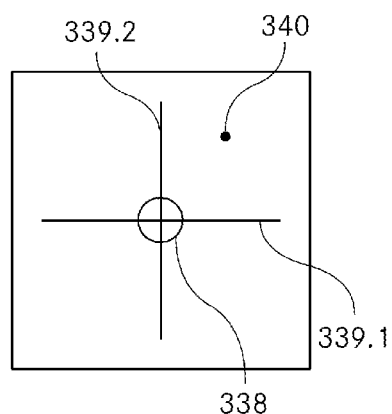
Figure 5D:
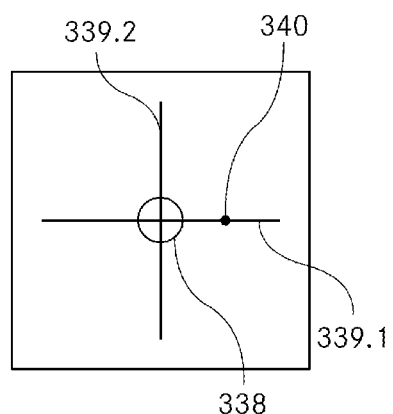

In a third step, the laser beam 100 at a reduced output of the laser is focused onto a position on the region of the nozzle around the port of the nozzle opening 37, in that the collimation unit 305 in the third arm 302.3 of the lance 301 is accordingly positioned. Herein, the focusing of the laser beam 100 is checked in a step-by-step procedure in each case by a recording of the CCD camera 303, until the focal point 340 of the laser beam 100 in the depiction has a minimum size. A depiction of this type, having an optimally focused laser beam 100, is schematically illustrated in FIG. 5c, wherein the marker 338 that has been established in the first two steps of the method has been transferred to this depiction. For illustrative reasons, the brightly illuminated focal point 340 herein is illustrated as a dark point.

After this third step, the focal point 340 of the laser beam 100 in a fourth step is positioned on the first of the two mutually intersecting lines 339.1 of the marker 338. Since a movement of the focal point 340 along the second of the two mutually intersecting lines 339.3 is achieved by a pivoting movement of the second mirror 308 about the second axis 309, the setting of a suitable orientation of the second mirror 308 suffices to this end. The procedure in this fourth step may be iterative in that by recording a depiction by the CCD camera 303 and transferring the marker 338 to this depiction it is in each case checked whether the focal point 304 of the laser beam 100 is actually positioned on the first line 339.1 of the marker 338. Thereafter, the orientation of the second mirror 308 about the second axis 309 is stored as the first positioning parameter.

Figure 5E:
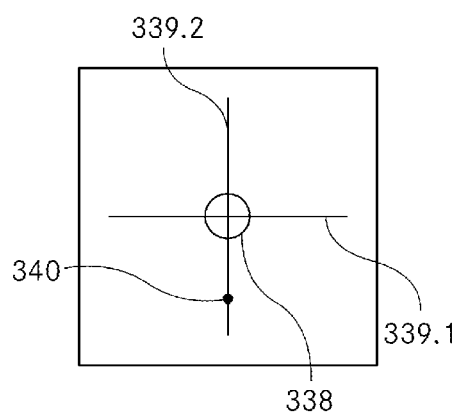

In a fifth step, the focal point 340 of the laser beam 100 is positioned on the second of the two mutually intersecting lines 339.2 of the marker 338. Since a movement of the focal point 340 along the first of the two mutually intersecting lines 339.1 is achieved by a pivoting movement of the first mirror 306 about the first axis 307, the setting of a suitable orientation of the first mirror 306 suffices to this end. In order to be able to check whether the focal point 340 is positioned correctly on the second line 339.2 by means of recording of depictions by the CCD camera 303 and by transferring the marker 338 to these depictions, the second mirror 308 at the commencement of the fifth step is pivoted somewhat about the second axis 309 such that the focal point 340 of the laser beam 100 in the case of any movement of the first mirror 306 about the first axis 307 is always moved through next to the port of the nozzle opening 37. As soon as the focal point 340 is positioned on the second line 339.2 of the marker 338, as is illustrated in FIG. 5e, the orientation of the first mirror 306 about the first axis 307 is stored as the second positioning parameter.

Figure 5F:
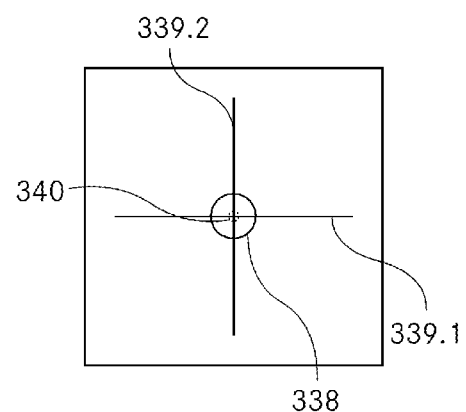

In a sixth step of the method, the second mirror 308 is oriented about the second axis 309, according to the first positioning parameter, and the first mirror 306 is oriented about the first axis 307, according to the second positioning parameter. On account thereof, the focal point 340 of the laser beam 100 is positioned in the port of the nozzle opening 37, and the laser beam 100 is coupled into the liquid jet 200 that is generated by the nozzle opening 37. Since no light of the laser beam 100 is reflected from the region of the nozzle around the port of the nozzle opening to the CCD camera 303 in the case of a positioning of the focal point 340 of the laser beam 100 of this type, the focal point 304 cannot be identified in a depiction that is captured by the CCD camera 303. Accordingly, the focal point 340 of the laser beam 100 in FIG. 5f is shown only as a dashed line in the center of the marker 338.

In order to enable this method to be carried out, the liquid-jet laser machine tool 300 may comprise a memory for storing the first and the second positioning parameter, and an intermediate memory for storing the marker. Moreover, the liquid-jet laser machine tool 300 may comprise a control unit for controlling the positioning of the collimation unit 305 in the third arm 302.3 of the lance 301, and for controlling the orientation of the first and of the second mirror 306, 308 about the first or second axis 307, 309, respectively. However, there is also the possibility for the memory, the intermediate memory, or the control unit to be configured separately from the liquid-jet laser machine tool 300. In this way, the memory, the intermediate memory, and the control unit may be formed by a computer, for example, to which the liquid-jet laser machine tool is connected.

The second invention is not limited to the liquid-jet laser machine tool 300 and to the method that has been described in detail by means of FIGS. 5a to 5f. In this way, the liquid-jet laser machine tool 300 may have another machining head, for example. Also, the lance and the arms of the lance may be configured in another manner. For example, the lance may have no junction such that said lance also does not have any arms which proceed from a junction. Moreover, the two mirrors may also be disposed in another manner, aligned in another manner, and may be pivotable about axes that are aligned in another manner.

Furthermore, there is the possibility for the liquid-jet laser machine tool to not have a CCD camera but another type of two-dimensional image sensor. Also, it is not necessary for the entire collimation unit to be movable in the beam direction or counter to the beam direction. In this way, the collimation unit may also have only individual movable elements, for example. Likewise, however, there is also the possibility for the liquid-jet laser machine tool to not comprise a collimation unit of this type but only an optical unit.

Depending on the embodiment, the optical unit may be assigned to the machining head, or else be embodied separately from the machining head.

Furthermore, the method for focusing the laser beam into the nozzle opening of the nozzle of the liquid-jet laser machine tool, for coupling the laser beam into the liquid jet that is generated by the nozzle opening, is not limited to the method that has been described in detail. In this way, the method may comprise additional steps, for example. Moreover, individual steps of the steps described may be modified or omitted. For example, amending the marker with the two mutually intersecting lines may be dispensed with. This step may be deleted without replacement, or be replaced by a step in which other lines are added to the marker.

In summary it is to be stated that a machining head for a liquid-jet laser machine tool which also enables three-dimensional machining of objects is achieved. Moreover, a liquid-jet laser machine tool which simplifies coupling the laser beam into the liquid jet is achieved. Moreover, a method for focusing a laser beam into a nozzle opening of a nozzle in a liquid-jet laser machine tool of this type is achieved, which method simplifies coupling of the laser beam into the liquid jet.

The invention claimed is:

1. A liquid-jet laser machine tool having a machining head for coupling a laser beam, which is provided from a laser or is being fed through a port of the liquid-jet laser machine tool, into a liquid jet, wherein the machining head has a nozzle having a nozzle opening for generating the liquid jet when supplied with a liquid from a liquid source, and a focusing installation which is capable of focusing the laser beam into port of the nozzle opening for the laser beam to be coupled into the liquid jet that is generatable by the nozzle opening, and wherein the liquid-jet laser machine tool comprises a two-dimensional image sensor for a region of the nozzle around the port of the nozzle opening to be depicted, wherein the liquid-jet laser machine tool comprises an optical element that is movable into and out of the beam path of the laser beam and which is capable, when disposed in the beam path, to diffusely scatter the laser beam so as to defocus the laser beam from the port of the nozzle opening or that the focusing installation is capable of focusing a focus point of the laser beam ahead of or behind the port of the nozzle opening in such manner that the laser light of the laser beam is defocused from the region of the nozzle around the port of the nozzle opening, such that the region of the nozzle around the port of the nozzle opening is capable of reflecting the laser light from the defocused laser beam toward the two-dimensional image sensor so that a depiction of the region of the nozzle around the port of the nozzle opening is capable of being captured by the two-dimensional image sensor, in which depiction the port of the nozzle opening is identifiable.

2. The liquid jet laser machine tool as claimed in claim 1, wherein a first mirror for the laser beam to be redirected, and a second mirror for the laser beam to be redirected, wherein the first mirror, driven by a first motor, is pivotable only about a first axis, and the second mirror, driven by a second motor, is pivotable only about a second axis, wherein the first axis is aligned with the second axis in such a manner that by way of a pivoting movement of the first mirror about the first axis the laser beam is movable along a first straight line across the region of the nozzle around the port of the nozzle opening, while by way of a pivoting movement of the second mirror about the second axis, the laser beam is movable along a second straight line across the region of the nozzle around the port of the nozzle opening, wherein the first and the second straight lines are mutually disposed at an angle and therefore intersect.

3. The liquid-jet laser machine tool as claimed in claim 1, wherein the focusing installation comprises individual collimation optical elements for the laser beam to be collimated to form a parallel beam, and at least one optical element for focusing the parallel beam onto a focal point.

4. The liquid jet laser machine tool as claimed in claim 3, wherein the individual collimation optical elements, is/are movable, for the collimation of the laser beam to be modified and, on account thereof, for a distance of the focal point of the laser beam from the at least one optical element to be modified.

5. The liquid jet laser machine tool as claimed in claim 1, wherein the image sensor comprises a CCD camera and this CCD camera comprises a suitable, movable lens in order to be able to make the contour of the port of the nozzle opening clearly identifiable in the depiction.

6. The liquid jet laser machine tool as claimed in claim 1, wherein the machining head for coupling a laser beam into a liquid jet comprises the following
   a) at least one optical element for focusing the laser beam, and
   b) a liquid chamber that is delimited by a wall, wherein a nozzle having a nozzle opening for generating a liquid jet is disposed in the wall,
   c) wherein, in a state in which the liquid chamber is connected to the at least one optical element, the laser beam
      a. is capable of being focused by the at least one optical element is directable in a beam direction through the liquid chamber into the nozzle opening, and
      b. is capable of being coupled into the liquid jet that is generatable by the nozzle and runs in the beam direction,
   d) wherein, for the liquid chamber to be supplied with liquid from the at least one optical element, a liquid interface is formed between the at least one optical element and the liquid chamber,
   e) wherein, in the state in which the liquid chamber is connected to the at least one optical element, the liquid interface, when viewed in the beam direction, is disposed ahead of that at least one optical element that is last in the beam direction.

7. The liquid jet laser machine tool as claimed in claim 6, wherein, in the state in which the liquid chamber is connected to the at least one optical element, the liquid interface has a liquid-interface area that is aligned at an angle in relation to a plane that is aligned so as to be perpendicular to the beam direction.

8. The liquid-jet laser machine tool as claimed in claim 7, wherein the liquid-interface area runs parallel with the beam direction.

9. The liquid-jet laser machine tool as claimed in claim 6, wherein the liquid chamber tapers off in one direction, wherein this direction, in the state in which the liquid chamber is connected to the at least one optical element, corresponds to the beam direction.

10. The liquid jet laser machine tool as claimed in claim 9, wherein the tapering is cone-shell-shaped.

11. The liquid jet laser machine tool as claimed in claim 10, wherein the cone-shell-shaped tapering has a cone-opening angle, measured between a rotationally symmetrical central axis of the cone-shell shape and the external area of the cone-shell shape, of at most 60°, at most 45°, at most 30°, in particular of at most 20°.

12. The liquid-jet laser machine tool as claimed in claim 6, wherein the liquid chamber has a gas-exit nozzle for shaping a gas jet that envelops the liquid jet.

13. The liquid jet laser machine tool as claimed in claim 12, wherein the liquid chamber has a gas back-pressure chamber which, in the state in which the liquid chamber is connected to the at least one optical element, is disposed behind the nozzle opening when viewed in the beam direction.

14. The liquid jet laser machine tool as claimed in claim 12, wherein, in the state in which the liquid chamber is connected to the at least one optical element, for the liquid chamber to be supplied with gas for the gas jet, a gas interface is formed between the at least one optical element and the liquid chamber which, when viewed in the beam direction, is disposed ahead of that at least one optical element that is last in the beam direction.

15. The liquid-jet laser machine tool as claimed in claim 14, wherein, in the state in which the liquid chamber is connected to the at least one optical element, the gas interface has a gas-interface area that is aligned at an angle in relation to a plane that is aligned so as to be perpendicular to the beam direction.

16. The liquid jet laser machine tool as claimed in claim 15, wherein the gas interface, in the state in which the liquid chamber is connected to the at least one optical element, runs parallel with the beam direction.

17. The liquid jet laser machine tool as claimed in claim 6, wherein the liquid chamber has a cavity which is open on one side and into which, in the state in which the liquid chamber is connected to the at least one optical element, the at least one optical element protrudes.

18. The liquid-jet laser machine tool as claimed in claim 6, wherein the at least one optical element forms a ferrule and encloses the liquid chamber at the liquid interface.

* * * * *